United States Patent
Gillis et al.

(10) Patent No.: US 12,305,983 B2
(45) Date of Patent: May 20, 2025

(54) METHODS AND APPARATUS FOR MEASURING A FEATURE OF GLASS-BASED SUBSTRATE

(71) Applicant: Corning Incorporated, Corning, NY (US)

(72) Inventors: Earle William Gillis, Elmira, NY (US); Aaron Russell Greenbaum, Pittsford, NY (US)

(73) Assignee: CORNING INCORPORATED, Corning, NY (US)

( * ) Notice: Subject to any disclaimer, the term of this patent is extended or adjusted under 35 U.S.C. 154(b) by 183 days.

(21) Appl. No.: 17/920,528

(22) PCT Filed: Jun. 10, 2021

(86) PCT No.: PCT/US2021/036739
§ 371 (c)(1),
(2) Date: Oct. 21, 2022

(87) PCT Pub. No.: WO2021/257362
PCT Pub. Date: Dec. 23, 2021

(65) Prior Publication Data
US 2023/0152082 A1    May 18, 2023

Related U.S. Application Data

(60) Provisional application No. 63/040,247, filed on Jun. 17, 2020.

(51) Int. Cl.
*G01B 9/02098* (2022.01)
*G01B 11/02* (2006.01)
*G01B 11/24* (2006.01)

(52) U.S. Cl.
CPC .......... *G01B 9/02098* (2013.01); *G01B 11/02* (2013.01); *G01B 11/24* (2013.01)

(58) Field of Classification Search
CPC ............ G01B 9/02098; G01B 9/02018; G01B 9/02024; G01B 11/02; G01B 11/04;
(Continued)

(56) References Cited

U.S. PATENT DOCUMENTS 3,657,727 A    4/1972   Blevins
7,283,227 B2  10/2007   Dureiko
(Continued)

FOREIGN PATENT DOCUMENTS

JP          4362335 B2    11/2009
KR  10-2020-0016794 A     2/2020
(Continued)

OTHER PUBLICATIONS

Craig R. Forest, Claude R. Canizares, Daniel R. Neal, Michael McGuirk, Mark Lee Schattenburg, "Metrology of thin transparent optics using Shack-Hartmann wavefront sensing," Opt. Eng. 43(3) (Mar. 1, 2004) https://doi.org/10.1117/1.1645256 (Year: 2004).*
(Continued)

*Primary Examiner* — Dominic J Bologna
*Assistant Examiner* — Jonathon Cook
(74) *Attorney, Agent, or Firm* — Matthew J. Mason

(57) ABSTRACT

An apparatus can comprise an illumination source and at least one wave front sensor that positioned in a first region. A reflector can be positioned in a second region. A measurement plane can be positioned between the first region and the second region. The reflector can be configured to reflect the light. The at least one wave front sensor can be configured to detect the light. Methods of measuring a feature of a glass-based substrate can comprise emitting light from the illumination source. Methods can comprise transmitting the light through a thickness of the glass-based substrate. Method can comprise transmitting the light through a target location of a first major surface of the
(Continued)

glass-based substrate. Methods can comprise detecting the light with the at least one wave front sensor and generating a signal based on the detected light.

15 Claims, 8 Drawing Sheets

(58) Field of Classification Search
CPC . G01B 11/0675; G01B 11/24; G01B 11/2441; G01M 11/02; G01M 11/0242; G01M 11/0271; G01M 11/0228; G01M 11/0278; G01N 21/41; G01N 21/45; G01N 21/4133; G01N 21/02; G01N 21/88; G01N 21/958
See application file for complete search history.

(56) References Cited

U.S. PATENT DOCUMENTS

| | | | |
|---|---|---|---|
| 7,298,497 | B2 | 11/2007 | Millerd et al. |
| 7,419,264 | B1 | 9/2008 | Otten, III et al. |
| 7,728,961 | B2 | 6/2010 | Watson |
| 8,908,191 | B2 | 12/2014 | Tschudi et al. |
| 9,389,187 | B2 | 7/2016 | Furnas |
| 9,977,154 | B2 | 5/2018 | Hofeldt et al. |
| 2008/0062422 | A1 | 3/2008 | Thomas et al. |
| 2009/0103108 | A1 | 4/2009 | Huang |
| 2012/0019813 | A1* | 1/2012 | Yoshitake .......... G01M 11/0207 356/213 |
| 2014/0240489 | A1* | 8/2014 | Furnas ................. G01N 21/896 348/131 |
| 2014/0347664 | A1 | 11/2014 | Schrader et al. |
| 2019/0242781 | A1 | 8/2019 | Rosen et al. |
| 2019/0361226 | A1* | 11/2019 | Sugimoto ............ G02B 26/123 |
| 2021/0263497 | A1* | 8/2021 | Neal ...................... G02C 7/049 |

FOREIGN PATENT DOCUMENTS

| | | | | |
|---|---|---|---|---|
| TW | 200918850 A | | 5/2009 | |
| WO | WO-2018045280 A1 * | | 3/2018 | ......... G01N 21/8901 |

OTHER PUBLICATIONS

Gavin R. G. Erry, Paul Harrison, Leonard John Otten, Lawrence D. Weaver, "Comparison of a Shack-Hartmann and distorted grating wavefront sensor using WaveTrain simulation software," Proc. SPIE 5572, Optics in Atmospheric Propagation and Adaptive Systems VII, (Nov. 11, 2004); (Year: 2004).*

Li, Chenhui, et al. "Three-dimensional surface profile measurement of microlenses using the Shack-Hartmann wavefront sensor," Journal of Microelectromechanical Systems, vol. 21, No. 3, Jun. 3, 2012, pp. 530-540.

Berto, Pascal, et al. ,"Tunable and free-form planar optics", Nature Photonics, vol. 13, 2019, pp. 649-656.

Bon, Pierre, et al. "Quadriwave lateral shearing interferometry for quantitative phase microscopy of living cells," Optics Express, Jul. 20, 2009, vol. 17, pp. 1-15.

Gong, Hai, et al., "Optical path difference microscopy with a shack-Hartmann wavefront sensor", Optical Letters, 2017, vol. 42, No. 11, pp. 1-4.

International Search Report and Written Opinion of the International Searching Authority; PCT/US2021/0367398; dated Oct. 1, 2021; 13 pages; Korean Patent Office.

Taiwanese Patent Application No. 110121862, Office Action dated Nov. 11, 2024, 4 pages (English Translation only), Taiwanese Patent Office.

* cited by examiner

METHODS AND APPARATUS FOR MEASURING A FEATURE OF GLASS-BASED SUBSTRATE

CROSS-REFERENCE TO RELATED APPLICATIONS

This application claims the benefits of priority under 35 U.S.C. § 371 of International Application Serial No.: PCT/US2021/036739, filed on Jun. 10, 2021, which claims the benefit of priority under 35 U.S.C. § 119 of U.S. Provisional Application Ser. No. 63/040,247 filed on Jun. 17, 2020, the contents of which are relied upon and incorporated herein by reference in their entirety.

FIELD

The present disclosure relates generally to methods and apparatus of measuring a feature of a glass-based substrate and, more particularly, to methods and apparatus of measuring a feature of a glass-based substrate using an illumination source.

BACKGROUND

Display devices include liquid crystal displays (LCDs), electrophoretic displays (EPD), organic light-emitting diode displays (OLEDs), plasma display panels (PDPs), or the like. Display devices can be part of a portable electronic device, for example, a consumer electronic product, a smartphone, a tablet, a wearable device, or a laptop.

Display devices often comprise one or more glass-based substrates. It is important to identify, characterize, and measure features in glass-based substrates so that those features can be mitigated before using the glass-based substrate in various applications (e.g., display devices).

It is known to inspect glass-based substrates using, for example, a camera (e.g., digital camera, CCD camera), with various techniques, for example, bright-field illumination, oblique illumination, or knife-edge illumination. These techniques can identify the location of features (e.g., inclusions, scratches, blisters, surface discontinuities) and/or qualitatively characterize features. However, the increased resolution necessary to quantitatively characterize features, if possible using a given technique, can require meticulous calibration, extended exposure, multiple exposures, and/or exposures at several orientations.

Consequently, there may be a need to develop methods and apparatus that can be used to measure a feature of a glass-based substrate. There may be a need for accurate and quantitative measurements of features. Further, there may be a need to measure features using a method that may not require extensive calibration (e.g., using a method that may be vibration in insensitive and/or may not require re-calibration between each measurement). Moreover, there may be a need to measure features quickly (e.g., less than a second) so that the measurement can be integrated inline into or with glass manufacturing apparatus.

SUMMARY

There are set forth herein apparatus and methods for measuring a feature of a glass-based substrate. The apparatus of the disclosure can facilitate quick, inline measurement of features, increasing production efficiency, and decreasing processing time. The apparatus of the disclosure can quantitatively characterize a wide range of feature sizes, reducing the need for multiple inspections. The apparatus of the disclosure can minimize the need for recalibration and/or realignment, reducing downtime.

Providing at least one wave front sensor can enable quantitative and accurate measurement of features that are vibration insensitive. For example, using a wave front sensor can reduce the need for recalibration of the apparatus. For example, using a wave front sensor can enable measurement while the glass-based substrate is moving and/or has recently been moved. Likewise, providing a wave front sensor can enable quick (e.g., about 100 milliseconds or less) measurement of features. Additionally, wave front sensors can be integrated with additional (e.g., existing) inspection apparatus (e.g., a camera).

Providing at least one wave front sensor can enable measurement at various distances from the measurement plane (e.g., first major surface of the glass-based substrate). Adjusting a distance from the measurement plane can enable the different types of features (e.g., surface profile, blister, gas inclusion, metal inclusion) to be distinguished. Additionally, adjusting a distance from the measurement plane can be used to adjust the size of features that can be accurately and quantitatively detected. Providing more than one wave front sensor with different magnifications can enable measurement of a wide range of feature sizes simultaneously. For example, using more than one wave front sensor with different magnifications can reduce the need for subsequent inspection (e.g., reinspection) of the feature.

Providing one or more wave front sensors and an illumination source in a first region that is opposite a second region comprising a reflector with a measurement plane (e.g., glass-based substrate) between the first region and the second region can reduce (e.g., alleviate) alignment issues between the illumination source and the wave front sensor. For example, providing a common support for both the illumination source and the wave front sensor can maintain alignment even when subject to vibrations or intentionally moved.

Some example embodiments of the disclosure are described below with the understanding that any of the features of the various embodiments may be used alone or in combination with one another.

In some embodiments, an apparatus can comprise an illumination source and at least one wave front sensor positioned in a first region. The apparatus can comprise a reflector positioned in a second region. The apparatus can comprise a measurement plane positioned between the first region and the second region. The illumination source can be configured to emit light that impinges on the measurement plane. The reflector can be configured to reflect the light from the illumination source. The at least one wave front sensor can be configured to detect the light reflected by the reflector.

In further embodiments, a path distance between the illumination source and the measurement plane can be adjustable.

In further embodiments, a detection distance between the at least one wave front sensor and the measurement plane can be adjustable.

In further embodiments, the illumination source can be configured to emit light comprising coherent light In further embodiments, the illumination source can be configured to emit light comprising a pulse.

In further embodiments, the illumination source can comprise a laser.

In further embodiments, the at least one wave front sensor can comprise a Shack-Hartmann wave front sensor.

In further embodiments, the at least one wave front sensor can comprise a lateral shearing interferometer.

In even further embodiments, the lateral shearing interferometer can comprise a quadri-wave lateral shearing interferometer.

In further embodiments, the at least one wave front sensor can comprise a pyramid wave front sensor.

In further embodiments, the apparatus can further comprise a beam splitter configured to split the light into a plurality of beams. The at least one wave front sensor can comprise a first wave front sensor configured to detect a first beam of the plurality of beams and a second wave front sensor configured to detect a second beam of the plurality of beams.

In even further embodiments, the apparatus can further comprise a second optical device configured to change a magnification of the second beam relative to the magnification of the first beam.

In even further embodiments, the apparatus can further comprise an optical device configured to change a magnification of the first beam.

In even further embodiments, the apparatus can further comprise an optical camera configured to detect the first beam of the plurality of beams.

In some embodiments, a method of measuring a feature of a glass-based substrate can comprise impinging light on a measurement plane of the glass-based substrate. The measurement plane can extend transverse to a thickness of the glass-based substrate. The thickness can be defined between a first major surface of the glass-based substrate and a second major surface of the glass-based substrate. The method can comprise reflecting the light towards the glass-based substrate. The method can comprise transmitting the reflected light through a thickness of the glass-based substrate towards the first major surface of the glass-based substrate and through a target location of the first major surface of the glass-based substrate. The method can comprise detecting the light transmitted through the target location using at least one wave front sensor. The method can comprise generating a first signal with the at least one wave front sensor based on the detected light.

In further embodiments, impinging the light on the measurement plane can comprise impinging the first major surface of the glass-based substrate.

In further embodiments, the method can further comprise moving the glass-based substrate in a direction transverse to the thickness of the glass-based substrate before the transmitting the light through the thickness. The method can further comprise moving the glass-based substrate in the direction transverse to the thickness of the glass-based substrate after the detecting the light transmitted through the target location using the at least one wave front sensor.

In even further embodiments, no signal may be generated by the at least one wave front sensor after the moving the glass-based substrate before the transmitting the light through the thickness and before the generating the first signal with the at least one wave front sensor.

In even further embodiments, a measurement time can be defined between an end of the moving the glass-based substrate before the transmitting the light through the thickness and a beginning of the moving the glass-based substrate after the detecting the light transmitted through the target location using the at least one wave front sensor can be about 100 milliseconds or less.

In further embodiments, the glass-based substrate can be moving in a direction transverse to the thickness of the glass-based substrate when the light is transmitted through the thickness of the glass-based substrate.

In some embodiments, methods of measuring a feature of a glass-based substrate can comprise transmitting light through a thickness of the glass-based substrate towards a first major surface of the glass-based substrate and through a target location of the first major surface of the glass-based substrate. The thickness can be defined between the first major surface and a second major surface. The method can comprise detecting the light transmitted through the target location using the at least one wave front sensor. The method can comprise generating a first signal with the at least one wave front sensor based on the detected light. The glass-based substrate can be moving a direction transverse to the thickness of the glass-based substrate when the light is transmitted through the thickness of the glass-based substrate.

In some embodiments, the method can comprise measuring a feature of a glass-based substrate comprising transmitting light through a thickness of the glass-based substrate towards a first major surface of the glass-based substrate through a target location of the first major surface of the glass-based substrate. The thickness can be defined between the first major surface and a second major surface. The method can comprise detecting the light transmitted through the target location using at least one wave front sensor. The method can comprise generating a first signal with the at least one wave front sensor based on the detected light. The method can comprise moving the glass-based substrate in a direction transverse to the thickness of the glass-based substrate before the transmitting the light through the thickness. The method can comprise moving the glass-based substrate in the direction transverse to the thickness of the glass-based substrate after the detecting the light transmitted through the target location using the at least one wave front sensor. A measurement time can be defined between an end of the moving the glass-based substrate before the transmitting the light through the thickness and a beginning of the moving the glass-based substrate after the detecting the light transmitted through the target location using the at least one wave front sensor can be about 100 milliseconds or less.

In further methods, the method can further comprise impinging light on a measurement plane of the glass-based substrate. The measurement plane can extend transverse to a thickness of the glass-based substrate. The thickness can be defined between a first major surface of the glass-based substrate and a second major surface of the glass-based substrate. The method can further comprise reflecting the light towards the glass-based substrate before transmitting the light through the thickness.

In further embodiments, the method can further comprise determining a height and/or width of a feature of the glass-based substrate based on the generated first signal.

In even further embodiments, the determining the height and/or width of the feature of the glass-based substrate can be further based on an index of refraction of the glass-based substrate.

In further embodiments, the feature can comprise a surface profile of the glass-based substrate at the target location.

In further embodiments, the feature can comprise an inclusion below the surface of the glass-based substrate at the target location.

In even further embodiments, the inclusion can comprise a gas.

In even further embodiments, the inclusion can comprise a metal.

In further embodiments, the at least one wave front sensor can comprise a Shack-Hartmann wave front sensor.

In further embodiments, the at least one wave front sensor can comprise a lateral shearing interferometer.

In even further embodiments, the lateral shearing interferometer can comprise a quadri-wave lateral shearing interferometer.

In further embodiments, the at least one wave front sensor can comprise a pyramid wave front sensor.

In further embodiments, the method can further comprise splitting the first pulse transmitted through the target location into a plurality of beams comprising a first beam and a second beam. The method can further comprise changing a magnification of the first beam. Detecting the transmitted first pulse using at least one wave front sensor can comprise detecting the first beam with a first wave front sensor of the at least one wave front sensor. Detecting the transmitted first pulse using at least one wave front sensor can further comprise detecting the second beam with a second wave front sensor of the at least one wave front sensor.

In further embodiments, the method can further comprise splitting the light transmitted through the target location into a plurality of beam comprising a first beam and a second beam. The method can further comprise changing a magnification of the first beam. Detecting the transmitted light using the at least one wave front sensor can comprise detecting the first beam with a first wave front sensor of the at least one wave front sensor and detecting the second beam with a second wave front sensor of the at least one wave front sensor.

In even further embodiments, changing the magnification of the first beam can range from about 2× to about 50× magnification.

In even further embodiments, the method can further comprise changing a magnification of the second beam relative to the magnification of the first beam.

In still further embodiments, the magnification of the first beam can be about 150% to about 1000% of the magnification of the second beam.

In even further embodiments, the method can further comprise detecting the first beam with an optical camera.

In further embodiments, the light can comprise a first pulse. The method can further comprise adjusting a detection distance between the first major surface and the at least one wave front sensor. The method can further comprise impinging the measurement plane with a second pulse. The method can further comprise reflecting the second pulse towards the glass-based substrate. The method can further comprise transmitting the reflected second pulse through the thickness of the glass-based substrate towards the first major surface of the glass-based substrate and through the target location of the first major surface of the glass-based substrate. The method can further comprise detecting the second pulse transmitted through the target location using the at least one wave front sensor. The method can further comprise generating a second signal with the at least one wave front sensor based on the detected second pulse.

In even further embodiments, the method can further comprise measuring the feature using the first signal and the second signal

BRIEF DESCRIPTION OF THE DRAWINGS

The above and other features and advantages of embodiments of the present disclosure are better understood when the following detailed description is read with reference to the accompanying drawings, in which.

Figure 1:
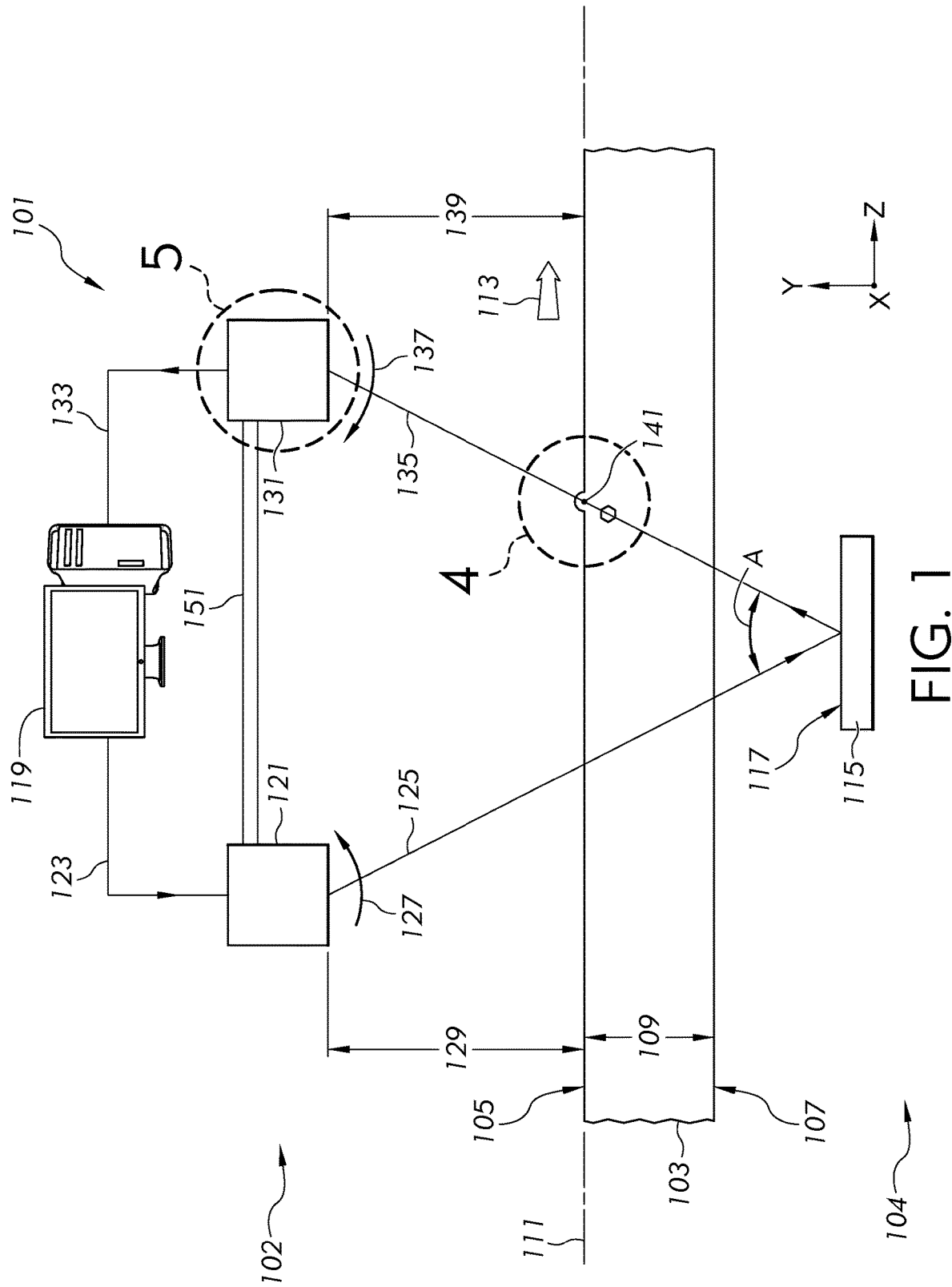
FIG. 1 shows exemplary embodiments of the measurement apparatus in accordance with embodiments of the disclosure.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Embodiments will now be described more fully hereinafter with reference to the accompanying drawings in which example embodiments are shown. Whenever possible, the same reference numerals are used throughout the drawings to refer to the same or like parts. However, claims may encompass many different aspects of various embodiments and should not be construed as limited to embodiments set forth herein.

Figure 2:
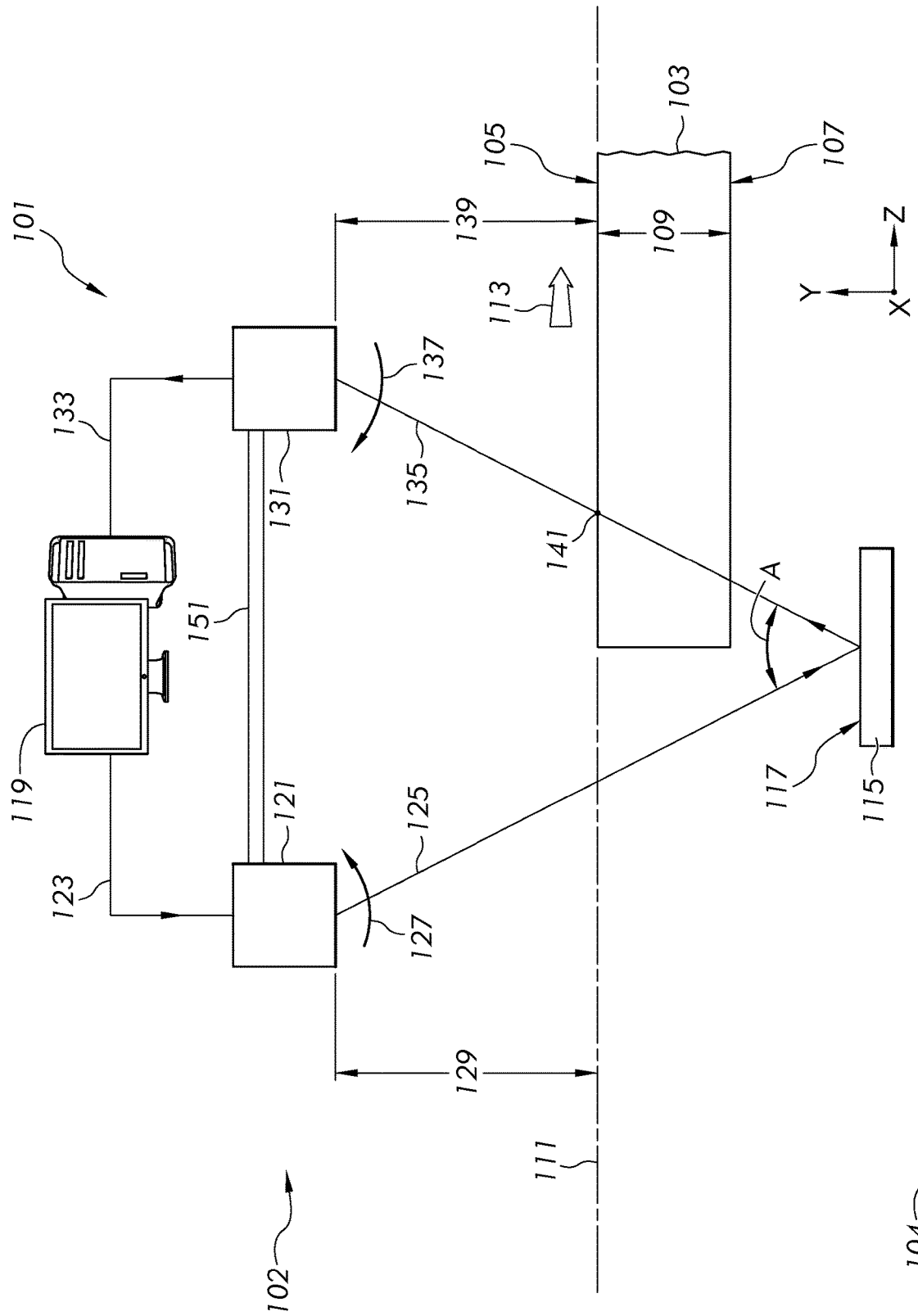
FIG. 2 shows exemplary embodiments of the measurement apparatus in accordance with embodiments of the disclosure.
Figure 3:
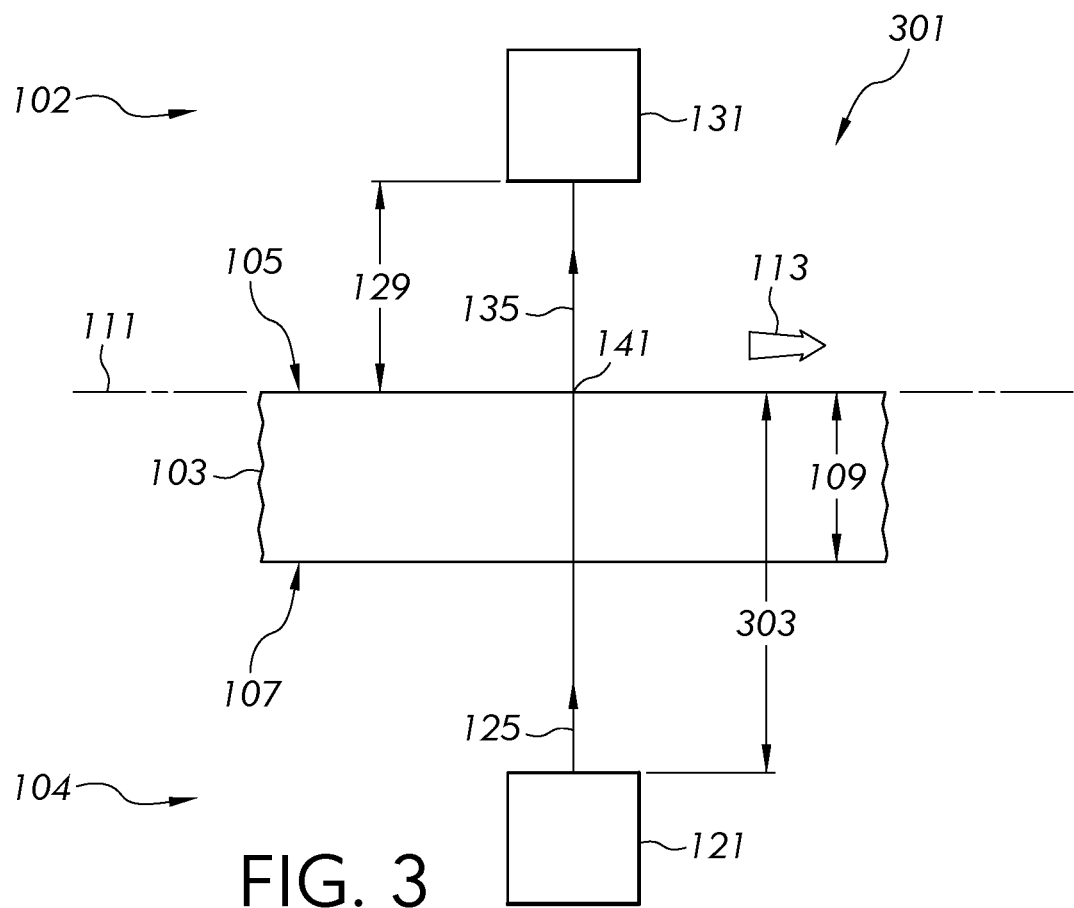
FIG. 3 shows exemplary embodiments of the measurement apparatus in accordance with embodiments of the disclosure.

FIGS. 1-3 illustrate views of apparatus 101, 301 in accordance with embodiments of the disclosure. Unless otherwise noted, a discussion of features of some embodiments can apply equally to corresponding features of any of embodiments of the disclosure. For example, identical part numbers throughout the disclosure can indicate that, in some embodiments, the identified features are identical to one another and that the discussion of the identified feature of one embodiment, unless otherwise noted, can apply equally to the identified feature of any of the other embodiments of the disclosure.

As shown in FIGS. 1-3, the apparatus 101, 301 can comprise an illumination source 121. In some embodiments, the illumination source 121 can comprise a laser, a light-emitting diode (LED), and/or an organic light emitting diode. In further embodiments, the laser can comprise a gas laser, an excimer laser, a dye laser, or a solid-state laser. Example embodiments of gas lasers include helium, neon, argon, krypton, xenon, helium-neon (HeNe), xenon-neon (XeNe), carbon dioxide ($CO_2$), carbon monoxide (CO), coper (Cu) vapor, gold (Au) vapor, cadmium (Cd) vapor, ammonia, hydrogen fluoride (HF), and deuterium fluoride (DF). Example embodiments of excimer lasers include chlorine, fluorine, iodine, or dinitrogen oxide ($N_2O$) in an inert environment comprising argon (Ar), krypton (Kr), xenon (Xe), or a combination thereof. Example embodiments of dye lasers include those using organic dyes, for example, rhodamine, fluorescein, coumarin, stilbene, umbelliferone, tetracene, or malachite green dissolved in a liquid solvent. Example embodiments of solid-state lasers include crystal lasers, fiber lasers, and laser diodes. Crystal-based lasers comprise a host crystal doped with a lanthanide, or a transition metal. Example embodiments of host crystals include yttrium aluminum garnet (YAG), yttrium lithium fluoride (YLF), yttrium othoaluminate (YAL), yttrium scandium gallium garnet (YSSG), lithium aluminum hexafluoride (LiSAF), lithium calcium aluminum hexafluoride (LiCAF), zinc selenium (ZnSe), zinc sulfide (ZnS), ruby, forsterite, and sapphire. Example embodiments of dopants include neodymium (Nd), titanium (Ti), chromium (Cr), cobalt (Co), iron (Fe), erbium (Er), holmium (Ho), thulium (Tm), ytterbium (Yb), dysprosium (Dy), cerium (Ce), gadolinium (Gd), samarium (Sm), and terbium (Tb). Example embodiments of solid crystals include ruby, alexandrite, chromium fluoride, forsterite, lithium fluoride (LiF), sodium chloride (NaCl), potassium chloride (KCl), and rubidium chloride (RbCl). Laser diodes can comprise heterojunction or PIN diodes with three or more materials for the respective p-type, intrinsic, and n-type semiconductor layers. Example embodiments of laser diodes include AlGaInP, AlGaAs, InGaN, InGaAs, InGaAsP, InGaAsN, InGaAsNSb, GaInP, GaAlAs, GaInAsSb, and lead (Pb) salts. Some laser diodes can represent exemplary embodiments because of their size, tunable output power, and ability to operate at room temperature (i.e., about 20° C. to about 25° C.).

In some embodiments, as shown in FIGS. 1-3, the illumination source 121 can be configured to emit light. In further embodiments, the light can comprise an optical wavelength in the visible spectrum, for example, ranging from about 300 nanometers (nm) to about 1,000 nm, from about 350 nm to about 900 nm, from about 400 to about 800 nm, from about 500 nm to about 700 nm, or any range or subrange therebetween. In even further embodiments, the first wavelength can be about 365 nm, about 415 nm, or about 590 nm. In further embodiments, the light can comprise an optical wavelength in the infrared spectrum, for example ranging from about 1 micrometer (µm) to about 20 µm, from about 5 µm to about 20 µm, from about 5 µm to about 15 µm, from about 8 µm to about 15 µm, from about 8 µm to about 12 µm, or any range or subrange therebetween.

In some embodiments, the illumination source can be configured to emit coherent light. As used herein, coherent light means that photons comprising the light maintain a substantially constant phase difference for a coherence length of at least 1 meter. In further embodiments, the coherent light can be spatially coherent, meaning that the light can maintain a substantially constant interference pattern over time. In further embodiments, the coherent light can be temporally coherent, meaning that the light can maintain a substantially constant interference pattern at different distances from the illumination source. Exemplary embodiments of coherent light sources can comprise a laser, a light-emitting diode (LED), or an organic LED (OLED). In some embodiments, the illumination source can be configured to emit incoherent light. Exemplary embodiments of incoherent light sources can comprise an incandescent lightbulb, an LED emitting light through a pinhole aperture.

In some embodiments, the illumination source can be configured to emit polarized light. As used herein, polarized light means that the photons comprising the light comprise substantially the same polarization (e.g., linear, circular, elliptical, vertical, horizontal). In some embodiments, although not shown, the illumination source can comprise an optical compensator (e.g., half-wave plate and/or a quarter-wave plate) that can control the polarization of the emitted light. In even further embodiments, although not shown, one of the half-wave plate or the quarter-wave plate can be rotatable relative to the other, which can change the polarization of a light beam passing through it. In further embodiments, although not shown the optical compensator can comprise an electronically controlled polarization modulator, for example, a liquid-crystal-based modulator or a ferroelectric liquid-crystal-based modulator. In some embodiments, the illumination source can be configured to emit non-polarized light (e.g., isotropic, Lambertian).

In some embodiments, the illumination source can be configured to continuously emit light. For example, the illumination source can comprise a laser operated in a continuous wave (CW) mode. In some embodiments, the illumination source can be configured to emit one or more pulses of light. In further embodiments, a pulse of the one or more pulses can comprise a pulse time of about 0.5 nanoseconds (ns) to about 1 millisecond (ms), from about 0.5 ns to about 1 microsecond (µm), from about 0.5 ns to about 100 ns, from about 0.5 ns to about 50 ns, from about 0.5 ns to about 20 ns, from about 2 ns to about 100 ns, from about 2 ns to about 50 ns, from about 2 ns to about 20 ns, from about 5 ns to about 100 ns, from about 5 ns to about 50 ns, from about 5 ns to about 20 ns, or any range or subrange therebetween. In further embodiments, the illumination can emit a plurality of pulses in one or more bursts of pulses. In even further embodiments, the pulses of the burst of pulses can be separated by a time in a range from about 0.5 ns to about 100 ns, from about 0.5 ns to about 50 ns, from about 0.5 ns to about 20 ns, from about 2 ns to about 100 ns, from about 2 ns to about 50 ns, from about 2 ns to about 20 ns, from about 5 ns to about 100 ns, from about 5 ns to about 50 ns, from about 5 ns to about 20 ns, or any range or subrange therebetween. Bursts each comprising a burst of one or more pulses can be generated at a range in a range from about 10 kilohertz (kHz) to about 1 megahertz (MHz), from about 10 kHz to about 500 kHz, 50 kHz to about 1 MHz, from about 50 kHz to about 500 kHz, from about 100 kHz to about 500 kHz, from about 100 kHz to about 200 kHz, or any range or subrange therebetween. In some embodiments, the number of pulses in the burst of pulses can be about 20 or less or about 10 or less, for example in a range from 1 to 10, 1 to 5, 1 to 3, 3 to 10, 3 to 5, or any range or subrange therebetween. In some embodiments, number pulses in the burst of pulses can be in a range from about 100 to about 1,500, from about 100 to about 1,000, from about 100 to about 800, from about 300 to about 1,500, from about 300 to about 1,000, from about 300 to about 800, from about 600 to about 1,500, from about 600 to about 1,000, from about 600 to about 800, or any range or subrange therebetween.

In some embodiments, as shown in FIG. 1-3, the illumination source 121 can be configured to emit light along a first light path 125. In further embodiments, although not shown, the apparatus (e.g., illumination source) can comprise a focusing lens. The focusing lens can be positioned along the first light path 125. After passing through the focusing lens, the light can be focused along of the first light path 125. The focusing lens can comprise a convex lens and/or an adjustable focal length lens. In further embodiments, the focusing lens can be configured to collimate the light along the first light path 125. In some embodiments, although not shown, a bandpass filter, additional focusing lenses, a light diffuser, a beam splitter, and/or an attenuator can be positioned along the first light path 125. In further embodiments, one or more of these additional elements can be controlled by the controller 119 via a first communication pathway 123.

Figure 5:
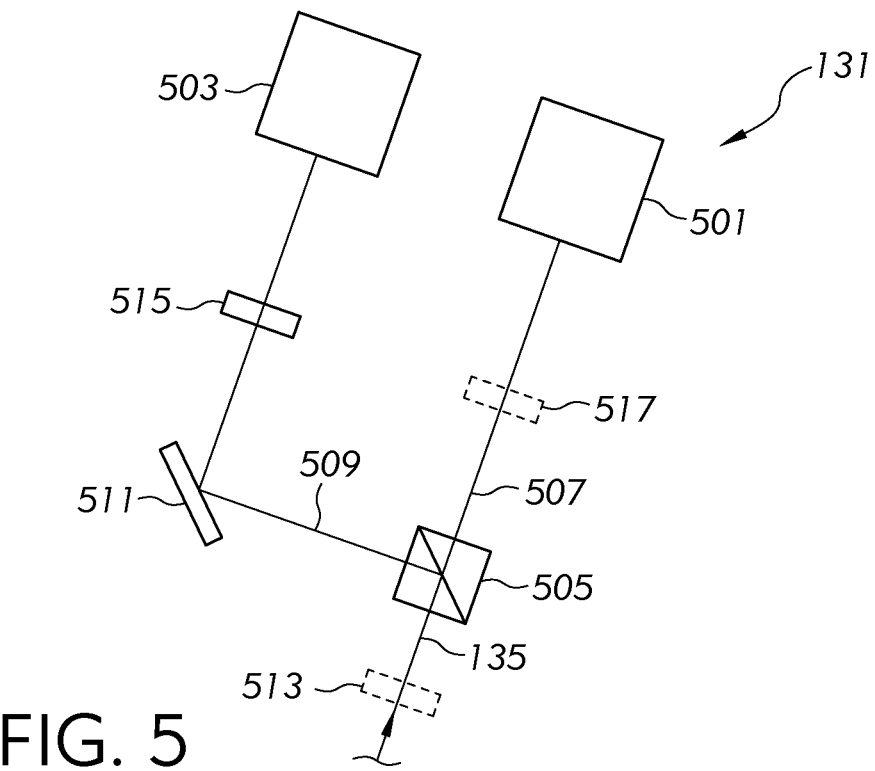
FIG. 5 is a schematic view of a detector comprising at least one wave-front sensor in accordance with embodiments of the disclosure.
Figure 6:
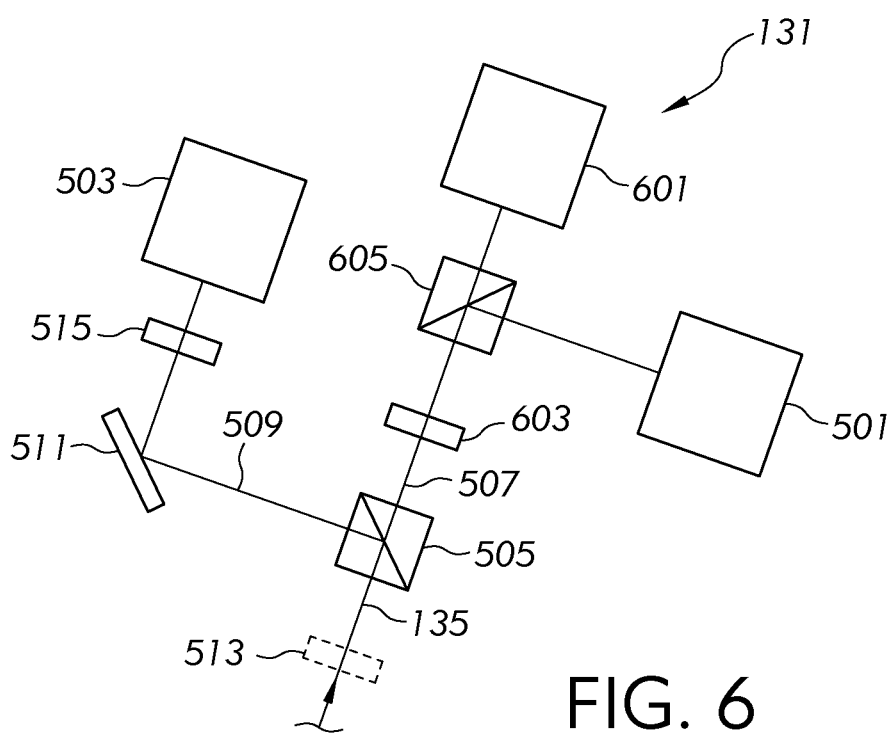
FIG. 6 is a schematic view of a detector comprising at least one wave-front sensor in accordance with embodiments of the disclosure.

As shown in FIGS. 1-3, the apparatus 101, 301 can comprise a detector 131. As shown in FIGS. 5-6, the detector 131 can comprise at least one wave front sensor. For example, as shown in FIGS. 5-6, the detector can comprise a first wave front sensor 501 and a second wave front sensor 503. It is to be understood that the detector can comprise one wave front sensor or more than two wave front sensors may be provided in further embodiments. Without wishing to be bound by theory, a wave front sensor can detect the light to generate a signal corresponding to a gradient of a wave front of the light. Without wishing to be bound by theory, the gradient of the wave front of the light can correspond to an optical path difference between an optical path length of different portions of the light through the sample. As used herein, the optical path length of light is the physical distance travelled by the light from the illumination source to the detector scaled by the refractive index/indices travelled through. It is to be understood than a discussion of the first wave front sensor 501 can apply equally to the second wave front sensor 503 unless indicated otherwise.

Figure 7:
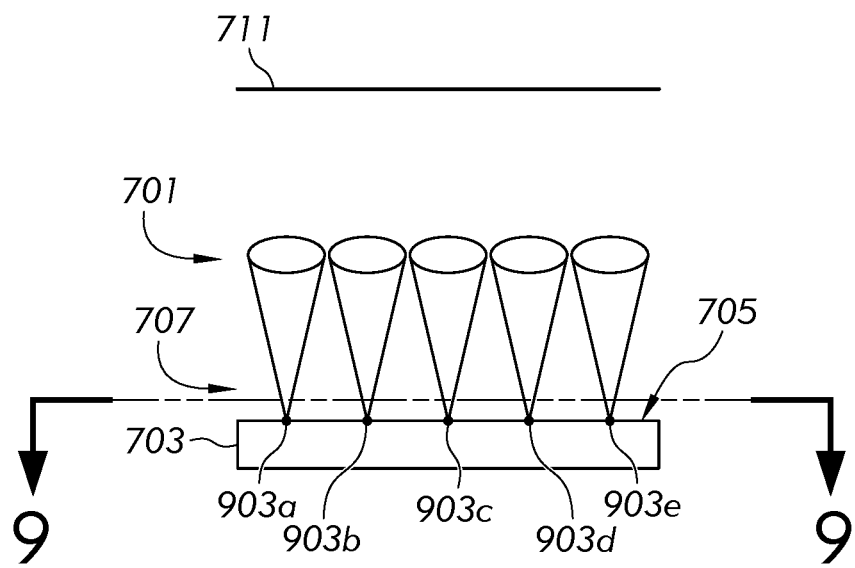
FIG. 7 is a schematic representation of a wave front sensor.
Figure 8:
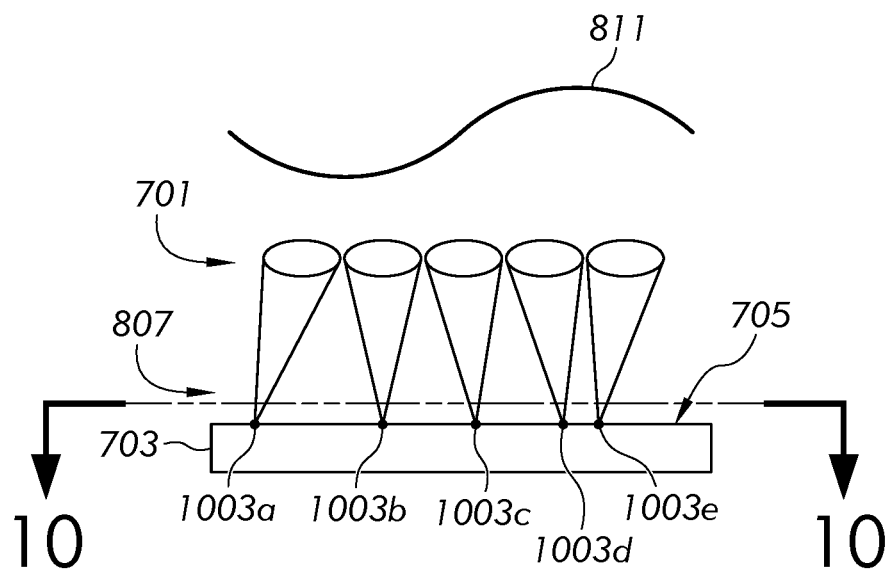
FIG. 8 is a schematic representation of a wave front sensor.

In some embodiments, the first wave front sensor 501 can comprise a Shack-Hartmann wave front sensor. As schematically illustrated in FIGS. 7-8, a Shack-Hartmann wave front sensor can comprise an array of lenses 701. As shown, the array of lenses 701 can comprise at least a row of lenses. In further embodiments, the array of lenses 701 can comprise a two-dimensional array. In further embodiments, a first lens of the array of lenses 701 can comprise a focal length than can be substantially equal to a focal length of a second lens of the array of lenses 701. In even further embodiments, each lens of the array of lenses 701 can comprise substantially the same focal length. In further embodiments, each lens of the array of lenses 701 can be substantially identical.

In some embodiments, a Shack-Hartmann wave front sensor can comprise an image detector 703. In further embodiments, as schematically illustrated in FIGS. 7-8, the image detector 703 can comprise a plurality of photon sensors (e.g., a charge-coupled device (CCD) array, a complementary metal-oxide-semiconductor (CMOS) array, an array of optical quad-cells). In even further embodiments, the plurality of photon sensors can be arranged in at least a row. In further embodiments, the plurality of photon sensors can comprise a two-dimensional array. In further embodiments, a number of photon sensors in the plurality of photon sensors comprising the image detector 703 can be equal to or greater than the number of lenses in the array of lenses 701.

Figure 9:
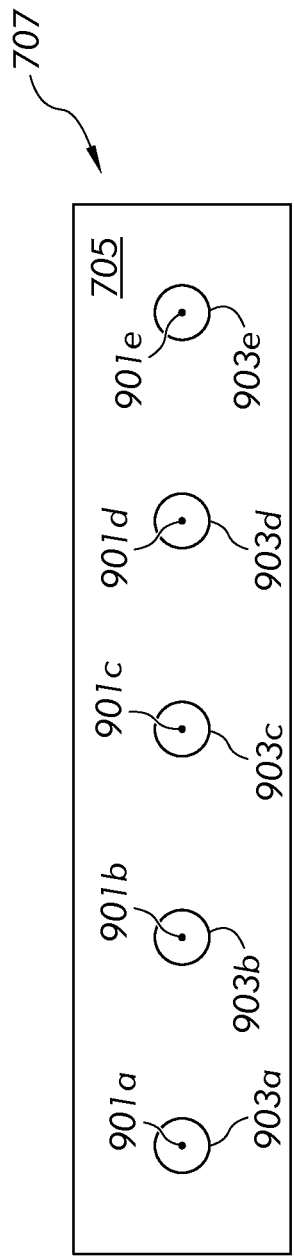
FIG. 9 is a cross-section taken along line 9-9 of FIG. 7.
Figure 10:
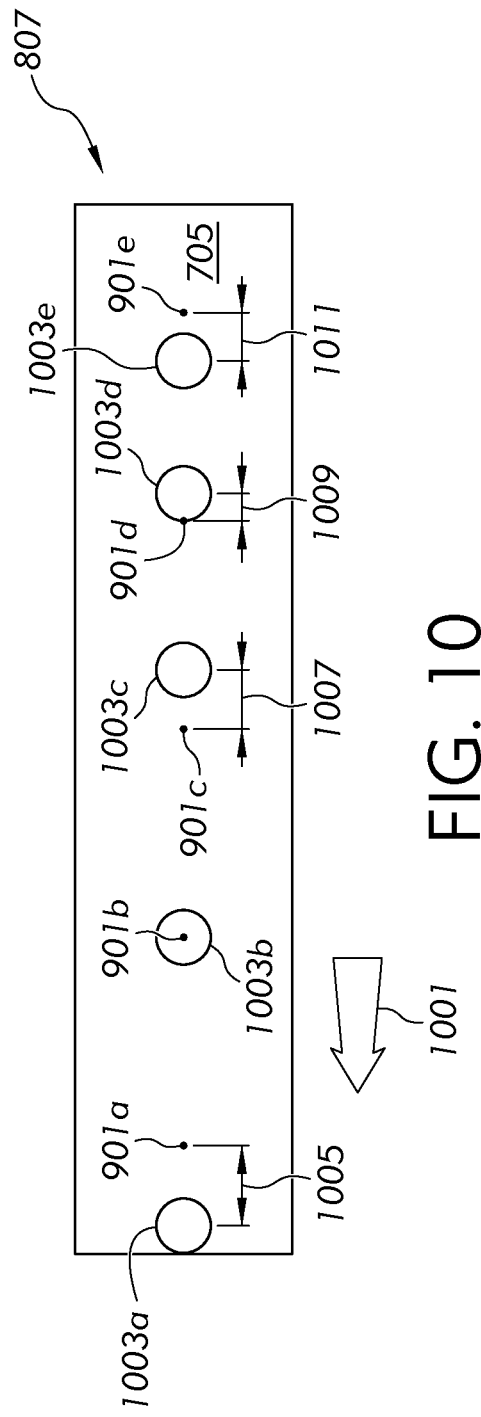
FIG. 10 is a cross-section taken along line 10-10 of FIG. 8.

As schematically illustrated in FIGS. 7-8, a Shack-Hartmann wave front sensor can be configured to detect light and/or a beam comprising focusing the light and/or beam using the array of lenses 701 into a plurality of spots 707, 807 onto an imaging plane 705 of the image detector 703. Without wishing to be bound by theory, a position of spot at the imaging plane focused by a lens of the array of lenses can correspond to a gradient of a wave front of light and/or beam to be detected. For example, with reference to FIGS. 7 and 9, a uniform wave front 711 incident on the wave front sensor can be focused by the array of lenses 701 into a plurality of spots 707 on the imaging plane 705 of the image detector 703. Further, as shown in FIG. 9, the spots 903a-903e comprising the plurality of spots 707 can substantially correspond to neutral locations 901a-901e on the imaging plane 705. As shown, alignment of the spots 903a-903 with the neutral location 901a-901e can indicate that the gradient of the incident wave front of the light and/or beam is substantially 0. For example, with reference to FIGS. 8 and 10, an aberrated wave front 811 incident on the wave front sensor can be focused by the array of lenses 701 into a plurality of spots 807 on the imaging plane 705 of the image detector 703. Further, as shown in FIG. 10, the spots 1003a-1003e comprising the plurality of spots 807 can be shifted to varying degrees from the corresponding neutral locations 901a-901e on the imaging plane 705. Some spots, for example, spot 1003b can substantially align with the corresponding neutral location 901b, which can indicate that the portion of the aberrated wave front 811 detected can be substantially 0. Other spots, for example, spot 1003a can be shifted from a corresponding neutral location 901a by a first distance 1005 in a first direction 1001, which can correspond to a gradient of a portion of the aberrated wave front 811. The spot 1003c can be shifted from a corresponding neutral location 901c by a second distance 1007 opposite the first direction 1001. Further, the first distance 1005 can be substantially equal to the second distance 1007. Additional spots, for example, spots 1003d, 1003e can be shifted from the corresponding neutral location 901d, 901e by a distance 1009, 1011 that can be less than the first distance 1005 and/or the second distance 1007. The aberrated wave front 811 can be approximated (e.g., reconstructed) by using the measured distances 1005, 1007, 1009, 1011 and the direction of the plurality of spots 807 (e.g., spots 1003a-1003e) from the corresponding neutral location 901a-901e as the gradient of the aberrated wave front 811.

In some embodiments, the first wave front sensor 501 can comprise a lateral shearing interferometer. In further embodiments, the lateral shearing interferometer can comprise a diffraction grating configured to generate an interference pattern on an imaging plane of an image detector from the incident light and/or beam. In further embodiments, the first wave front sensor 501 can comprise a quadri-wave lateral shearing interferometer. In even further embodiments, the quadri-wave lateral shearing interferometer can comprise a beam splitter configured to split the incident light and/or beam into four beam that can each be incident on a diffraction grating configured to generate an interference pattern on an imaging plane of an image detector. In still further embodiments, each diffraction grating of the quadri-wave lateral shearing interferometer can comprise different patterns and/or different shearing rates. Providing a quadri-wave lateral shearing interferometer can produce high resolution data (e.g., signals) that can be used to accurately reconstruct the wave front of the incident light and/or beam.

In some embodiments, the first wave front sensor 501 can comprise a pyramid wave front sensor. In further embodiments, the pyramid wave front sensor can comprise a pyramidal prism configured to split the incident light and/or beam into a plurality of beams (e.g., four beams) that can be incident on an imaging plane of an image detector. In even further embodiments, the plurality of beams from the pyramidal prism can be compared to detect information about a gradient of the wave front of the incident light and/or beam.

As shown in FIGS. 1-3 and 5-6, the detector 131 can be configured to detect light travelling along a second light path 135. In some embodiments, as shown in FIGS. 5-6, a beam splitter 505 can be positioned along the second light path 135 and can be configured to split the light incident to the beam splitter 505 into a plurality of beams. In further embodiments, as shown, the light can be split by the beam splitter 505 into a plurality of beams comprising a first beam 507 and a second beam 509. In even further embodiments, as shown, the first wave front sensor 501 can be configured to detect the first beam 507 of the plurality of beams. In even further embodiments, as shown, the second wave front sensor 503 can be configured to detect the second beam 509 of the plurality of beams. In still further embodiments, as shown, a mirror 511 can be configured to redirect the second beam 509 from the beam splitter 505 towards the second wave front sensor 503.

In some embodiments, as shown in FIG. 6, an optical camera 601 can be configured to detect the first beam 507 of the plurality of beams. In further embodiments, the optical camera 601 can comprise a digital camera, a CCD, and/or an array of photodetectors. In further embodiments, as shown, the optical camera 601 and the first wave front sensor 501 can both be configured to detect the first beam 507 generated by the beam splitter 505, for example, when an additional beam splitter 605 is configured to split the first beam 507 into a plurality of split beams and/or direct a first split beam of the plurality of split beams to the optical camera 601 and a second split beam of the plurality of split beams to the first wave front sensor 501. Providing a wave front sensor and an optical camera can enable inspection of a glass-based substrate using multiple techniques with the same detector. Providing a wave front sensor and an optical camera as shown in FIG. 6 can enable integration of the wave front sensor into detectors of inspection apparatus for other techniques, for example, a detector comprising an optical camera.

In some embodiments, as shown in FIGS. 5-6, the first detector may comprise one or more optical elements, for example focusing lenses, that can be, for example, configured to change magnification of light and/or a beam. In further embodiments, as shown, the detector 131 can optionally comprise a first focusing lens 513 positioned along the second light path 135 with the beam splitter 505 positioned between the first focusing lens 513 and the plurality of wave front sensors (e.g., first wave front sensor 501, second wave front sensor 503). The first focusing lens, if provided, can be configured to change a magnification of the light travelling along the first light path 125, which can change a magnification of the plurality of beams. In further embodiments, as shown in FIG. 5, the detector can optionally comprise a second focusing lens 517 positioned between the beam splitter 505 and the first wave front sensor 501. In further embodiments, as shown in FIG. 6, the detector 131 can comprise a second focusing lens 603 positioned between the beam splitter 505 and the first wave front sensor 501 and can be configured to change a magnification of the first beam 507 of the plurality of beams. For example, the second focusing lens 603 can be configured to change a magnification of the first beam 507 of the plurality of beams without changing a magnification of another beam (e.g., second beam 509) of the plurality of beams, which can change the magnification of the first beam 507 of the plurality of beams relative to the magnification of the another beam (e.g., second beam 509). In still further embodiments, the detector 131 can comprise both a first focusing lens 513 and a second focusing lens 517, 603.

In some embodiments, as shown in FIGS. 5-6, the detector 131 can comprise a third focusing lens 515 positioned between the beam splitter 505 and the second wave front sensor 503 and can be configured to change a magnification of the second beam 509 of the plurality of beams. In further embodiments, the third focusing lens 515 can be configured to change a magnification of the second beam 509 of the plurality of beams without changing the magnification of another beam (e.g., first beam 507) of the plurality of beams, which can change the magnification of the second beam 509 of the plurality of beams relative to the magnification of the another beam (e.g., first beam 507). In still further embodiments, the detector 131 can comprise both a first focusing lens 513 and a third focusing lens 515. In still further embodiments, the detector 131 can comprise both a second focusing lens 517, 603 and a third focusing lens 515. In yet further embodiments, the detector 131 can comprise a first focusing lens 513, a second focusing lens 517, 603, and a third focusing lens 515.

In some embodiments, the first focusing lens 513, the second focusing lens 517, 603, and/or the third focusing lens 515 can be configured to magnify the light and/or beam of the plurality of beams by about 2× or more, about 5× or more, about 10× or more, about 50× or less, about 30× or less, or about 20× or less. In some embodiments, the first focusing lens 513 and/or the second focusing lens 517, 603 can be configured to magnify the light and/or beam of the plurality of beams can range from about 2× to about 50×, from about 5× to about 50×, from about 10× to about 50×, from about 10× to about 30×, from about 10× to about 20×, or any range or subrange therebetween.

In some embodiments, a total magnification of the first beam 507 from the first focusing lens 513 and/or the second focusing lens 517, 603, if provided, can be about 2× or more, about 5× or more, about 10× or more, about 50× or less, about 30× or less, or about 20× or less. In some embodiments, a total magnification of the first beam 507 from the first focusing lens 513 and/or the second focusing lens 517, 603, if provided, can range from about 2× to about 50×, from about 5× to about 50×, from about 10× to about 50×, from about 10× to about 30×, from about 10× to about 20×, or any range or subrange therebetween.

In some embodiments, the magnification of the first beam 507 of the plurality of beams can be different from the magnification of second beam 509 of the plurality of beams. In further embodiments, the magnification of the first beam 507 of the plurality of beams as a percentage of the magnification of the second beam 509 of the plurality of beams can be about 150% or more, about 200% or more, about 400% or more, about 1000% or less, about 800% or less, or about 600% or less. In further embodiments, the magnification of the first beam 507 of the plurality of beams as a percentage of the magnification of the second beam 509 of the plurality of beams can range from about 150% to about 1000%, from about 200% to about 1000%, from about 200% to about 800%, from about 200% to about 600%, from about 400% to about 1000%, from about 400% to about 800%, from about 400% to about 600%, or any range or subrange therebetween. In further embodiments, the magnification of the second beam 509 of the plurality of beams as a percentage of the magnification of the first beam 507 of the plurality of beams can be about 150% or more, about 200% or more, about 400% or more, about 1000% or less, about 800% or less, or about 600% or less. In further embodiments, the magnification of the second beam 509 of the plurality of beams as a percentage of the magnification of the first beam 507 of the plurality of beams can range from about 150% to about 1000%, from about 200% to about 1000%, from about 200% to about 800%, from about 200% to about 600%, from about 400% to about 1000%, from about 400% to about 800%, from about 400% to about 600%, or any range or subrange therebetween. Providing different magnification of the first beam relative to the magnification of the second beam can enable measurement of a wide range of feature sizes simultaneously and/or can reduce the need for subsequent inspection (e.g., reinspection) of the feature.

In some embodiments, as shown in FIGS. 1-2, the apparatus 101 can comprise a controller 119 that can be connected to the detector 131 by a second communication pathway 133. In further embodiments, a signal detected by the detector 131 (e.g., wave front sensor) can be transmitted along the second communication pathway 133 to the controller 119. In further embodiments, the controller 119 can be configured to adjust the magnification, positioning, orientation, and/or data acquisition rate of the detector 131, for example, using the second communication pathway 133. In further embodiments, as shown, the controller 119 can be connected to the illumination source 121 by the first communication pathway 123. In even further embodiments, the controller 119 can be configured to adjust the positioning and/or orientation of the illumination source 121 and/or the type of light emitted from the illumination source 121. As discussed below, it is to be understood that the first communication pathway 123 and/or the second communication pathway 133 can be a physical connection or a wireless connection.

As used herein, the term "controller" can encompass all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them. In some embodiments, the controller can comprise and/or be implemented in digital electronic circuitry, or in computer software, firmware, or hardware, including the structures disclosed in this specification and their structural equivalents, or in combinations of one or more of them. Embodiments of controllers described herein can be implemented as one or more computer program products (e.g., one or more modules of computer program instructions encoded on a tangible program carrier for execution by, or to control the operation of, data processing apparatus). The tangible program carrier can be a computer-readable medium. The computer-readable medium can be a machine-readable storage device, a machine-readable storage substrate, a memory device, or a combination of one or more of them. A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The processes described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit) to name a few. Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few. Computer-readable media suitable for storing computer program instructions and data include all forms of data memory including nonvolatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry. To provide for interaction with a user, embodiments described herein can be implemented on a computer having a display device, e.g., a CRT (cathode ray tube) or LCD (liquid crystal display) monitor, and the like for displaying information to the user and a keyboard and a pointing device, e.g., a mouse or a trackball, or a touch screen by which the user can provide input to the computer. Other kinds of devices can be used to provide for interaction with a user as well; for example, input from the user can be received in any form, including acoustic, speech, or tactile input. Embodiments described herein can be implemented in a computing system that includes a back-end component, e.g., as a data server, or that includes a middleware component, e.g., an application server, or that includes a front-end component, e.g., a client computer having a graphical user interface or a Web browser through which a user can interact with implementations of the subject matter described herein, or any combination of one or more such back-end, middleware, or front-end components. The components of the system can be interconnected by any form or medium of digital data communication, e.g., a communication network. Embodiments of communication networks include a local area network ("LAN") and a wide area network ("WAN"), e.g., the Internet. The computing system can include clients and servers. A client and server are generally remote from each other and typically interact through a communication network. The relationship of client and server arises from computer programs running on the respective computers and having a client-server relationship to each other.

In some embodiments, as shown in FIGS. 1-2, the apparatus 101 can comprise a reflector 115 comprising a reflective surface 117. In further embodiments, the reflector 115 can comprise a material that is inherently reflective such as aluminum, steel, or silver. In other such embodiments, the reflector 115 can comprise a material such as polyethyleneterephthalate (PET) or polycarbonate (PC) that is reflective when placed adjacent to another material having a different refractive index. In further embodiments, the reflector 115 may comprise an average reflectance over a wavelength range from about 400 nm to about 700 nm of about 90% or more, about 95% or more, about 96% or more, or about 98% or more. In some embodiments, as shown, the reflective surface 117 of the reflector 115 can face a sample 103 (e.g., a glass-based substrate) that can comprise a first major surface 105, a second major surface 107, and a thickness 109 defined between the first major surface 105 and the second major surface 107 of the sample 103 (e.g., glass-based substrate). As shown in FIGS. 1-2, the reflector 115 can face the second major surface 107 of the sample 103. In some embodiments, the reflector 115 can be configured to reflect light from the illumination source 121. In further embodiments, the reflector can be configured to reflect light travelling along the first light path 125 incident on the reflective surface 117 to travel through the sample 103 (e.g., the second major surface 107 of the sample 103, the thickness 109 of the sample 103, the first major surface 105 of the sample) and travel along the second light path 135 towards the detector 131. Throughout the disclosure, the reflector can reflect the light by reflecting at least a portion of the light emitted from the illumination source.

As shown in FIGS. 1-4, the apparatus 101, 301 can comprise a measurement plane 111. As used herein, the measurement plane comprises a target location that the apparatus is configured to characterize (e.g., measure). With reference to FIG. 1, the measurement plane 111 comprises a target location 141 of the first major surface 105 and extends in a first direction 113 (shown as the z-direction) and a second direction (shown as the x-direction). In some embodiments, the target location 141 can be a location on and/or in a sample 103 that the apparatus 101, 301 can be configured to measure. In some embodiments, the measurement plane 111 can extend parallel to the first major surface 105 and/or the second major surface 107 of the sample 103. In further embodiments, as shown in FIGS. 1-4, the first major surface 105 can extend along the measurement plane 111.

In some embodiments, the sample 103 can comprise the thickness 109 defined between the first major surface 105 and the second major surface 107 opposite the first major surface 105. In further embodiments, the thickness 109 can be about 25 µm or more, about 100 µm or more, about 200 µm or more, about 400 µm or more, about 10 millimeters (mm) or less, about 5 mm or less, about 2 mm or less, or about 1 mm or less. In further embodiments, the thickness 109 can range from about 25 µm to about 10 mm, from about 100 µm to about 10 mm, from about 200 µm to about 5 mm, from about 400 µm to about 2 mm, from about 400 µm to about 1 mm, from about 25 µm to about 5 mm, from about 25 µm to about 2 mm, from about 25 µm to about, 1 mm, from about 100 µm to about 1 mm, or any range or subrange therebetween. In some embodiments, the sample 103 can comprise a length across the first major surface 105 that can extend in the first direction 113 (shown as the z-direction). In some embodiments, the sample 103 can comprise a width in a direction perpendicular to the length (e.g., a second direction shown as the x-direction). In further embodiments, the dimensions (e.g., length, width) of the sample may correspond to the dimension of a consumer electronic product. In some embodiments, the sample can comprise a consumer electronic product and/or be configured to be included in a consumer electronic product. The consumer electronic product can comprise a glass-based portion and further comprise electrical components at least partially within a housing. The electrical components can comprise a controller, a memory, and a display. A display can be at or adjacent the front surface of the housing. The consumer electronic product can comprise a cover substrate disposed over the display.

In some embodiments, the sample 103 can comprise a glass-based sample. As used herein, "glass-based" includes both glasses and glass-ceramics, wherein glass-ceramics have one or more crystalline phases and an amorphous, residual glass phase. Glass-based material cool or has already cooled into a glass, glass-ceramic, and/or that upon further processing becomes a glass-ceramic material. A glass-based material (e.g., glass-based substrate) may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion-exchange of larger ions for smaller ions in the surface of the substrate, as discussed below. However, other strengthening methods known in the art, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In one or more embodiments, a glass-based material may comprise, in mole percent (mol %): $SiO_2$ in a range from about 40 mol % to about 80%, $Al_2O_3$ in a range from about 10 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali metal oxide, for example, $Li_2O$, $Na_2O$, $K_2O$, $Rb_2O$, and $Cs_2O$. As used herein, RO can refer to MgO, CaO, SrO, BaO, and ZnO. In some embodiments, a glass-based material may optionally further comprise in a range from 0 mol % to about 2 mol % of each of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$. "Glass-ceramics" include materials produced through controlled crystallization of glass. In some embodiments, glass-ceramics have about 1% to about 99% crystallinity. Examples of suitable glass-ceramics may include $Li_2O$—$Al_2O_3$—$SiO_2$ system (i.e. LAS-System) glass-ceramics, MgO—$Al_2O_3$—$SiO_2$ system (i.e. MAS-System) glass-ceramics, ZnO×$Al_2O_3$× $nSiO_2$ (i.e. ZAS system), and/or glass-ceramics that include a predominant crystal phase including β-quartz solid solution, ⊖-spodumene, cordierite, petalite, and/or lithium disilicate. The glass-ceramic materials may be strengthened using the strengthening processes described herein. In one or more embodiments, MAS-System glass-ceramic substrates may be strengthened in $Li_2SO_4$ molten salt, whereby an exchange of $2Li^+$ for $Mg^{2+}$ can occur.

In some embodiments, the sample 103 can be optically transparent. As used herein, "optically transparent" or "optically clear" means an average transmittance of 70% or more in the wavelength range of 400 nm to 700 nm through a 1.0 mm thick piece of a material. In some embodiments, an "optically transparent material" or an "optically clear material" may have an average transmittance of 75% or more, 80% or more, 85% or more, or 90% or more, 92% or more, 94% or more, 96% or more in the wavelength range of 400 nm to 700 nm through a 1.0 mm thick piece of the material. The average transmittance in the wavelength range of 400 nm to 700 nm is calculated by measuring the transmittance of whole number wavelengths from about 400 nm to about 700 nm and averaging the measurements.

In some embodiments, the sample 103 can comprise a first index of refraction. The first refractive index may be a function of a wavelength of light passing through the sample. For light of a first wavelength, a refractive index of a material is defined as the ratio between the speed of light in a vacuum and the speed of light in the corresponding material. Without wishing to be bound by theory, a refractive index of the sample can be determined using a ratio of a sine of a first angle to a sine of a second angle, where light of the first wavelength is incident from air on a surface of the sample at the first angle and refracts at the surface of the sample to propagate light within the sample at a second angle. The first angle and the second angle are both measured relative to a normal of a surface of the optically clear adhesive. In some embodiments, the first refractive index of the sample can be about 1 or more, about 1.3 or more, about 1.4 or more, about 1.5 or more, about 3 or less, about 2 or less, or about 1.7 or less, or about 1.6 or less. In some embodiments, the first refractive index of the sample can be in a range from about 1 to about 3, from about 1 to about 2 from about 1 to about 1.7, from about 1.3 to about 3, from about 1.3 to about 2, from about 1.3 to about 1.7, from about 1.4 to about 2, from about 1.4 to about 1.7, from about 1.4 to about 1.6, from about 1.5 to about 1.6, or any range or subrange therebetween.

Figure 4:
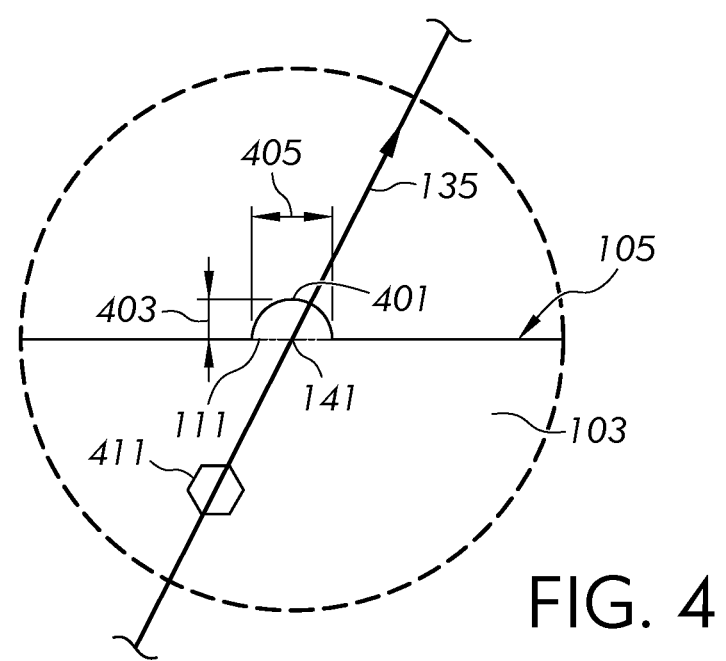
FIG. 4 is an enlarged view 4 in FIG. 1.

In some embodiments, the light can be configured to travel through a feature of the sample to be measured. Throughout the disclosure, the light can travel through the thickness of the sample and/or through the feature if at least a portion of the light emitted from the illumination source travels through the thickness of the sample and/or through the feature. In further embodiments, as shown in FIG. 4, the light path (e.g., second light path 135) a surface feature 401 can comprise a height 403 and/or width 405 that can be determined using the apparatus 101, 301. For example, the surface feature can impact a surface profile of the sample. In even further embodiments, the surface feature can comprise a blister, bubbling, a bump, cracking, cratering, crazing, and/or wrinkling. In further embodiments, the light can be configured to travel through subsurface features. In even further embodiments, the apparatus can be configured to measure subsurface features even when the measurement plane is coincident with a surface (e.g., first major surface) of the sample. In even further embodiments, although not shown, the measurement plane can impinge a subsurface feature. For example, as shown in FIG. 4, a subsurface feature can comprise an inclusion 411 below the first major surface 105 of the sample 103. As used herein, an inclusion comprises a localized concentration of material with different refractive index, transparency, hardness, Young's modulus, and/or coefficient of thermal expansion as compared to the sample as a whole. In some embodiments, the inclusion can comprise a gas, for example air, oxygen, nitrogen, hydrogen, carbon dioxide, or a combination thereof. In some embodiments, the inclusion can comprise a metal, for example platinum, tin, rhodium, rhenium, osmium, palladium, iridium, or combinations thereof.

As shown in FIGS. 1-3, the measurement plane 111 can be positioned between a first region 102 and a second region 104. As shown, the first region 102 can face the first major surface 105 of the sample 103 while the second region 104 can face the second major surface 107 of the sample 103. In some embodiments, as shown in FIG. 3, the illumination source 121 can be positioned in the second region 104 while the detector 131 can be positioned in the first region 102. In some embodiments, as shown in FIGS. 1-2, the illumination source 121 and the detector 131 can be positioned in the first region 102. In further embodiments, as shown, the reflector 115 can be positioned in the second region 104. In further embodiments, the apparatus 101 can be configured to maintain a fixed distance between the illumination source 121 and the detector 131. For example, as shown in FIGS. 1-2, the illumination source 121 and the detector 131 can be attached to a common support 151. Providing the detector comprising one or more wave front sensors and an illumination source in a first region that is opposite a second region comprising a reflector with a measurement plane (e.g., glass-based substrate) between the first region and the second region can reduce (e.g., alleviate) alignment issues between the illumination source and the wave front sensor. Further, providing a common support for both the illumination source and the wave front sensor can maintain alignment even when subject to vibrations or intentionally moved.

In some embodiments, as shown in FIGS. 1-2, an angle "A" can be defined between the first light path 125 and the second light path 135. In further embodiments, the angle "A" can be about 0.1° or more, about 0.5° or more, about 1° or more, about 2° or more, about 25° or less, about 15° or less, about 5° or less, or about 2° or less. In further embodiments, the angle "A" can range from about 0.1° to about 25°, from about 0.1° to about 15°, from about 0.1° to about 5°, from about 0.1° to about 2°, from about 0.5° to about 2°, from about 1° to about 2°, from about 0.5° to about 15°, from about 1° to about 15°, from about 1° to about 5°, from about 2° to about 5°, or any range or subrange therebetween. In further embodiments, as shown in FIGS. 1-2, the illumination source 121 can be rotable in a first direction 127. In further embodiments, as shown in FIGS. 1-2, the detector can be rotable in a second direction 137 opposite the first direction 127. In even further embodiments, the apparatus can be configured to rotate the illumination source 121 in the first direction 127 and rotate the detector 131 in the second direction 137 as a path distance 129 and/or a detection distance 139 is increased.

As used herein, a path distance is defined as a minimum distance between the illumination source and the measurement plane. For example, as shown in FIGS. 1-3, the path distance 129 can be defined between the illumination source 121 and the measurement plane 111. In some embodiments, the path distance 129 can be adjustable. In further embodiments, the path distance 129 can be about 10 mm or more, about 50 mm or more, about 100 mm or more, about 500 mm or more, about 10 meters or less, about 5 meters or less, or about 1 meter or less. In further embodiments, the path distance 129 can range from about 10 mm to about 10 meters, from about 10 mm to about 5 meters, from about 10 mm to about 1 meter, from about 50 mm to about 1 meter, from about 100 mm to about 1 meter, from about 500 mm to about 1 meter, from about 50 mm to about 10 meters, from about 100 mm to about 10 meters, from about 500 mm to about 10 meters, from about 500 mm to about 5 meters, from about 500 mm to about 2 meters, or any range or subrange therebetween. In some embodiments, the path distance 129 can be substantially equal to a distance between the illumination source 121 and the first major surface 105 of the sample 103. Adjusting a distance from the measurement plane can enable the different types of features (e.g., surface profile, blister, gas inclusion, metal inclusion) to be distinguished.

As used herein, a detection distance is defined as a minimum distance between the detection and the measurement plane. For example, as shown in FIGS. 1-2, the detection distance 139 can be defined between the detector 131 positioned in the first region 102 and the measurement plane 111. For example, as shown in FIG. 3, the detection distance 303 can be defined between the detector 131 positioned in the second region 104 and the measurement plane 111. In further embodiments, the detection distance 139, 303 can be about 10 mm or more, about 50 mm or more, about 100 mm or more, about 500 mm or more, about 10 meters or less, about 5 meters or less, or about 1 meter or less. In further embodiments, the detection distance 139, 303 can range from about 10 mm to about 10 meters, from about 10 mm to about 5 meters, from about 10 mm to about 1 meter, from about 50 mm to about 1 meter, from about 100 mm to about 1 meter, from about 500 mm to about 1 meter, from about 50 mm to about 10 meters, from about 100 mm to about 10 meters, from about 500 mm to about 10 meters, from about 500 mm to about 5 meters, from about 500 mm to about 2 meters, or any range or subrange therebetween. In some embodiments, the detection distance 139, 303 can be substantially equal to a distance between the detector 131 and the first major surface 105 of the sample 103. Adjusting a distance from the measurement plane can be used to adjust the size of features that can be accurately and quantitatively detected.

Figure 11:
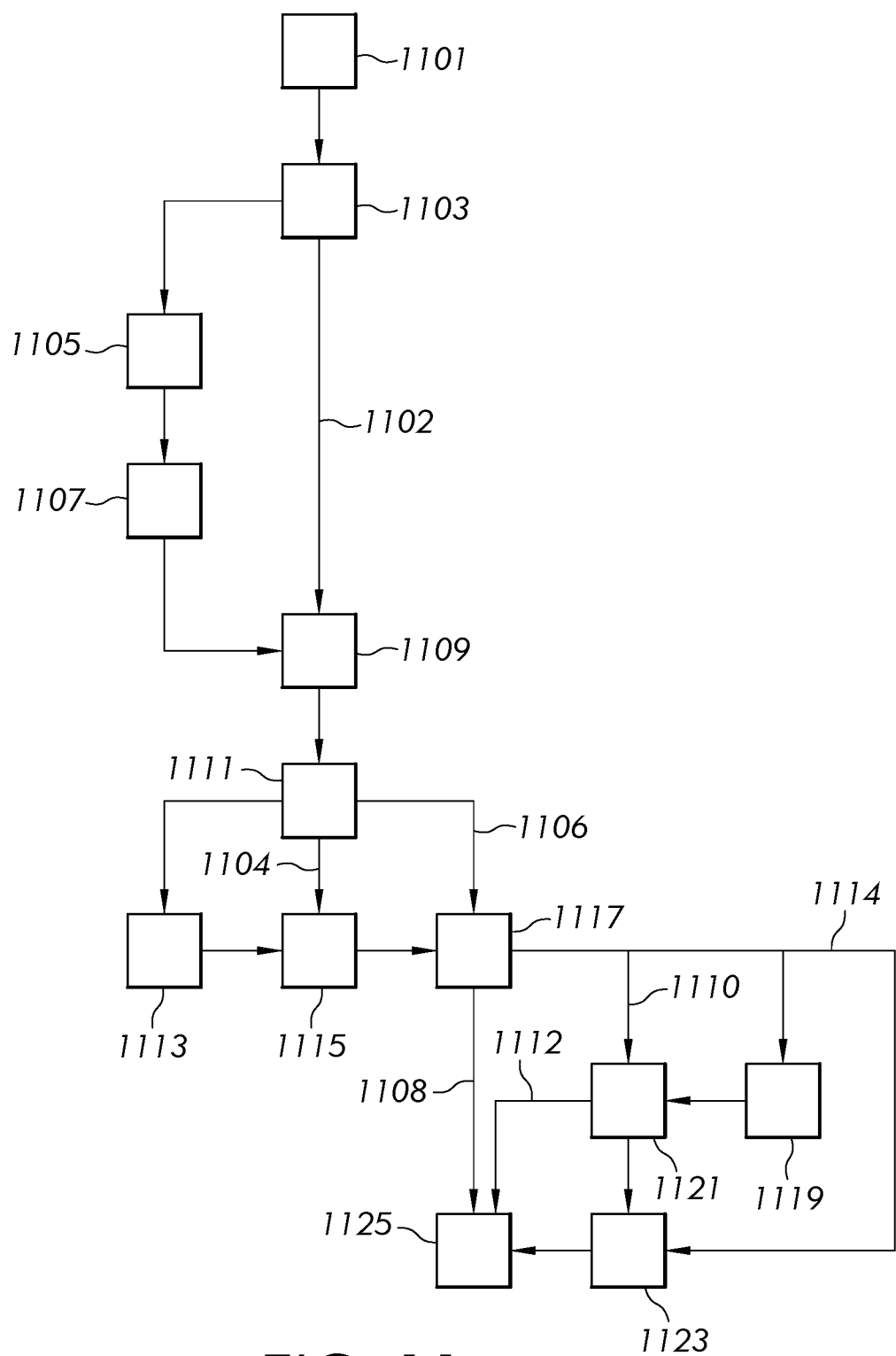
FIG. 11 is a flow chart illustrating example methods of embodiments of the disclosure.

Embodiments of methods of measuring a feature of a sample (e.g., glass-based substrate) in accordance with embodiments of the disclosure will be discussed with reference to the flow chart in FIG. 11.

In a first step 1101 of methods of measuring a feature of a sample, methods can start with providing a sample 103. In some embodiments, the sample 103 can comprise a glass-based substrate. In some embodiments, the sample 103 may be provided by purchase or otherwise obtaining a sample or by forming the sample using methods known in the art. In further embodiments, glass-based samples or layers of glass-based samples can be provided by forming them with a variety of ribbon forming processes, for example, slot draw, down-draw, fusion down-draw, up-draw, press roll, redraw or float. In some embodiments, the sample 103 can comprise a glass-based substrate manufactured in a glass manufacturing apparatus positioned upstream (e.g., opposite direction 113 in FIGS. 1-3) of the apparatus 101, 301. In some embodiments, step 1101 of providing the sample 103 can optionally provide the sample by moving the sample 103 (e.g., glass-based substrate) in a direction 113 to position the sample 103. In further embodiments, as shown in FIGS. 1-2, the direction 113 can be substantially transverse to the thickness 109 of the sample 103 (e.g., glass-based substrate). As shown in the flow chart in FIG. 11, if the sample 103 is moved in the step 1101 of providing the sample 103, the moving can occur before step 1105 and/or before step 1109 that are discussed below.

After step 1101, methods can proceed to step 1103 comprising emitting light from the illumination source 121. In some embodiments, the light emitted from the illumination source 121 can travel along the first light path 125 towards the measurement plane 111. In some embodiments, the illumination source 121 can substantially continuously emit light. In some embodiments, the illumination source 121 can emit one or more pulses of light. In some embodiments, the illumination source 121 can emit coherent light. In some embodiments, the path distance 129 between the illumination source 121 and the measurement plane 111 can be within one or more of the ranges discussed above for the path distance 129.

After step 1103, methods can proceed to step 1105 comprising impinging the light on the measurement plane 111. As discussed above, the measurement plane 111 can extend transverse (e.g., perpendicular) to thickness 109 of the sample 103 (e.g., glass-based substrate), which can be defined between the first major surface 105 and the second major surface 107 of the sample 103 and can be within any of the ranges discussed above for the thickness 109. In some embodiments, as shown in FIGS. 1-2, the measurement plane 111 can be parallel to and/or coincident with the first major surface 105 of the sample 103. In further embodiments, as shown in FIG. 1, impinging the measurement plane 111 with the light can further comprise impinging the first major surface 105 of the sample 103 with the light. In further embodiments, as shown in FIG. 2, the light can impinge the measurement plane 111 at a location where the sample 103 (e.g., first major surface 105) is not present.

After step 1105, methods can proceed to step 1107 comprising reflecting the light towards the sample 103 (e.g., glass-based substrate). As shown in FIGS. 1-2, reflecting the light towards the sample 103 can comprise reflecting the light off of the reflective surface 117 of the reflector 115. In some embodiments, as shown, an angle between the light incident to the reflective surface 117 and the reflected light can be within one or more of the ranges discussed above for the angle "A".

After step 1107, methods can proceed to step 1109 comprising transmitting the light (e.g., reflected light) through the thickness 109 of the sample 103 (e.g., glass-based substrate) towards the first major surface 105 of the sample 103 (e.g., glass-based substrate). In some embodiments, step 1109 can further comprise impinging the second major surface 107 of the sample 103 with the light (e.g., reflected light) before transmitting the light through the thickness 109 of the sample 103. In some embodiments, step 1109 can comprise moving the sample 103 (e.g., glass-based substrate) in the direction 113 when the light is transmitted through the thickness 109 of the sample. In further embodiments, as discussed above and shown in FIGS. 1-3, the direction 113 can be substantially transverse (e.g., perpendicular) to the thickness 109 of the sample 103 (e.g., glass-based substrate).

After step 1109, methods can proceed to step 1111 comprising transmitting the light (e.g., reflected light) through a target location 141 of the first major surface 105 of the sample 103 (e.g., glass-based substrate), as shown in FIGS. 1-3. In some embodiments, the measurement plane 111 can comprise target location 141 of the first major surface 105. In some embodiments, as shown in FIG. 4, the target location can comprise a surface feature 401 to be measured. As discussed above, the surface feature can impact a surface profile of the sample and/or the surface feature can comprise a blister, bubbling, a bump, cracking, cratering, crazing, and/or wrinkling. In some embodiments, as shown in FIG. 4, the light can be configured to travel through subsurface features before the light is transmitted through the target location 141 of the first major surface 105 of the sample 103. In even further embodiments, the apparatus can be configured to measure subsurface features even when the measurement plane is coincident with a surface (e.g., first major surface) of the sample. In even further embodiments, although not shown, the measurement plane can impinge a subsurface feature, for example, an inclusion that can comprise a gas (e.g., air, oxygen, nitrogen, hydrogen, carbon dioxide) and/or a metal (e.g., platinum, tin, rhodium, rhenium, osmium, palladium, iridium).

After step 1111, methods can proceed to step 1113 comprising splitting the light (e.g., reflected light) into a plurality of beams. In some embodiments, as shown in FIGS. 5-6, the light can be transmitted along the second light path 135 to impinge the beam splitter 505. In some embodiments, as shown, the light can impinge optics, for example, the first focusing lens 513 that can change a magnification and/or focus of the light. In some embodiments, as discussed above, the light can be split by the beam splitter 505 into a plurality of beams comprising the first beam 507 and the second beam 509. For example, as shown, the first beam 507 can be directed towards the first wave front sensor 501 and/or the second beam 509 can be directed towards the second wave front sensor 503.

After step 1113, methods can proceed to step 1115 comprising changing a magnification of at least one beam of the plurality of beams. In some embodiments, as shown in FIGS. 5-6, the magnification of the first beam 507 can be changed by the second focusing lens 517, 603. In further embodiments, the magnification of the first beam 507 from the first focusing lens 513 and/or second focusing lens 517, 603 can be within one or more of the ranges discussed above (e.g., from 2× magnification to about 50× magnification). In some embodiments, as shown in FIGS. 5-6, the magnification of the second beam 509 can be changed by the third focusing lens 515. In further embodiments, the magnification of the second beam 509 from the first focusing lens 513 and/or the third focusing lens 515 can be within one or more of the ranges discussed above (e.g., from about 2× magnification to about 50× magnification). In further embodiments, the third focusing lens 515 can change the magnification of the second beam 509 relative to the magnification of the first beam 507 (e.g., from the second focusing lens 517, 603). In even further embodiments, the magnification of the first beam 507 can be greater than the magnification of the second beam 509, and the magnification of the first beam 507 as a percentage of the magnification of the second beam 509 can be within one or more of the ranges discussed above (e.g., from about 150% to about 1000%). In even further embodiments, the magnification of the second beam 509 can be greater than the magnification of the first beam 507, and the magnification of the second beam 509 as a percentage of the magnification of the first beam 507 can be within one or more of the ranges discussed above (e.g., from about 150% to about 1000%).

After step 1115, methods can proceed to step 1117 comprising detecting the light (e.g., reflected light, transmitted light) using the at least one wave front sensor of the detector 131. Throughout the disclosure, the detector can reflect the light if the at least one wave front sensor detects at least a portion of the light emitted from the illumination source. As discussed above, the light transmitted through the target location 141 can be detected using the at least one wave front sensor of the detector 131. In some embodiments, the detection distance 139 between the detector 131 and the measurement plane 111 can be within one or more of the ranges discussed above for the detection distance 139. In some embodiments, as shown in FIGS. 5-6, the light can be detected by the first wave front sensor 501 when the first wave front sensor 501 detects the first beam 507 of the plurality of beams. In further embodiments, as shown in FIG. 6, the light (e.g., first beam 507) can further be detected by the optical camera 601. In some embodiments, as shown in FIG. 6, the light (e.g., first beam 507) can be detected by the optical camera 601. In some embodiments, as shown in FIGS. 5-6, the light can be detected using the second wave front sensor 503 when the second wave front sensor 503 detects the second beam 509 of the plurality of beams.

Step 1117 can further comprise generating a first signal with the at least one wave front sensor based on the light (e.g., detected light, transmitted light, detected light). In some embodiments, the signal can be generated by the first wave front sensor 501 and/or the second wave front sensor 503. In some embodiments, the first signal can comprise a series of distances between neutral locations and corresponding spots, as discussed above with respect to FIGS. 7-10. In some embodiments, the first signal can be transmitted to the controller 119 along the second communication pathway 133. In some embodiments, the first signal can be the first signal generated by the at least one front sensor for the sample 103 in the current position. In some embodiments, no signal may be generated by the at least wave front sensor after the moving the sample 103 (e.g., glass-based substrate) in step 1101 before the first signal is generated by the at least one wave front sensor. In some embodiments, no signal may be generated by the at least wave front sensor after the moving the sample 103 (e.g., glass-based substrate) in step 1101 before the transmitting the light through the thickness 109 in step 1109. In some embodiments, the first signal can be the first signal generated by the at least one front sensor for the sample 103 in the current position.

After step 1117, methods can proceed to step 1119 can comprise adjusting the detection distance 139 between the measurement plane 111 (e.g., first major surface 105) of the sample 103 and the detector 131. In some embodiments, step 1119 can comprise adjusting a path distance 129 between the measurement plane 111 (e.g., first major surface 105). In further embodiments, the path distance 129 and be adjusted by substantially the same amount that the detection distance 139 is adjusted. In some embodiments, the detection distance 139 can be increased. Without wishing to be bound by theory, wave front distortions from subsurface features can decay faster than wave front distortions from surface features. Consequently, wave front distortions from surface features and from subsurface features can be separated by comparing light detected (e.g., signals generated) at two or more different detection distances 139.

After step 1119, methods can proceed to step 1121 comprising generating a second signal. In some embodiments, the light can comprise a plurality of pulses. A first pulse of the plurality of pulses can be detected by the detector 131 comprising at least one wave front sensor (e.g., first wave front sensor 501, second wave front sensor 503) to generate the first signal. In further embodiments, a second pulse of the plurality of pulses can be emitted from the illumination source 121. In even further embodiments, the second pulse can impinge the measurement plane 111 before being reflected off the reflective surface 117 of the reflector 115 towards the sample 103 (e.g., glass-based substrate). The second pulse (e.g., reflected second pulse) can be transmitted through the thickness 109 of the sample 103 (e.g., glass-based substrate). The second pulse can be transmitted through the target location 141 of the first major surface 105 of the sample 103 (e.g., glass-based substrate). The second pulse transmitted through the target location 141 can be detected using the detector 131 comprising the at least one wave front sensor. The detector 131 comprising the at least one wave front sensor can generate a second signal based on the detected second pulse.

After step 1121, methods can proceed to step 1123 comprising moving the sample 103 in the direction 113. In some embodiments, as shown in FIGS. 1-3, step 1123 can comprise moving the sample 103 (e.g., glass-based substrate) in the direction 113 to position the sample 103. In further embodiments, as shown in FIGS. 1-3, the direction 113 can be substantially transverse (e.g., perpendicular) to the thickness 109 of the sample 103 (e.g., glass-based substrate). As shown in the flow chart in FIG. 11, the moving of step 1123 can occur after the detecting the light transmitted through the target location 141 in step 1117. In some embodiments, a measurement time can be defined between (i) an end of the moving the sample 103 (e.g., glass-based substrate) in step 1101 before the transmitting the light through the thickness 109 in step 1109 and (ii) a beginning of the moving the sample 103 (e.g., glass-based substrate) in step 1123 after the detecting the light transmitted through the target location 141 using the at least one wave front sensor (e.g., first wave front sensor 501, second wave front sensor 503) in step 1117. In further embodiments, the measurement time can be about 10 microseconds (µs) or more, about 100 µs or more, about 1 millisecond (ms) or more, about 10 ms or more, about 100 ms or less, about 50 ms or less, about 20 ms or less, or about 10 ms or less. In further embodiments, the measurement time can range from about 10 µs to about 100 ms, from about 100 µs to about 100 ms, from about 1 ms to about 100 ms, from about 1 ms to about 50 ms, from about 10 ms to about 50 ms, from about 10 ms to about 20 ms, or any range or subrange therebetween.

After step 1123, methods can proceed to step 1125 comprising measuring the feature using at least the first signal. In some embodiments, step 1125 can comprise measuring the feature using the first signal and the second signal. In further embodiments, the first signal and the second signal can be compared to more accurately measure a surface feature and/or a subsurface feature. In further embodiments, multiple measurements corresponding to multiple detected signals may be combined (e.g., averaged) to produce a composite detected signal. In some embodiments, measuring the feature can comprise determining a surface profile of the sample 103 (e.g., glass-based substrate) at the target location 141 of the first major surface 105. In some embodiments, measuring the feature can comprise determining a height and/or width of a feature of the sample 103 (e.g., glass-based substrate) based on at least the first signal (e.g., generated first signal). In some embodiments, measuring the feature can comprise using the at least one first signal and the index of refraction of the sample 103 (e.g., glass-based substrate).

In some embodiments, methods of measuring a feature of a sample (e.g., glass-based substrate) in accordance with embodiments of the disclosure can proceed along steps 1101, 1103, 1105, 1107, 1109, 1111, 1113, 1115, 1117, 1119, 1121, 1123, and 1125 sequentially, as discussed above. In some embodiments, methods can follow arrow 1102 from step 1103 to step 1109, for example, when using the apparatus 301 shown in FIG. 3. In further embodiments, methods following arrow 1102 can omit step 1105 comprising impinging the measurement plane 111 and/or reflecting the light in step 1107 using the apparatus 301 shown in FIG. 3. In some embodiments, methods can follow arrow 1104 from step 1111 to step 1115 when the beam splitter 505 of FIGS. 5-6 is omitted, for example, when the signal is to be detected by one wave front sensor (e.g., first wave front sensor 501). In some embodiments, methods can follow arrow 1106 from step 1111 to step 1117 to detect the light with one wave front sensor, for example, without splitting the light into a plurality of beams in step 1113 and/or changing a magnification of a beam of the plurality of beams in step 1115. In some embodiments, methods can follow arrow 1108 from step 1117 to step 1125, for example, when the feature is measured based on the first signal. For example, methods following arrow 1108 can omit generating a second signal in step 1121 as well as adjusting the detection distance 139 in step 1119 and/or the moving the sample 103 in step 1123. In some embodiments, methods can follow arrow 1110 from step 1117 to step 1121, for example, when multiple signals are to be generated at the same detection distance 139 by omitting step 1119 comprising adjusting the detection distance 139. In some embodiments, methods can follow arrow 1112 from step 1121 to step 1125 omitting moving the sample 103 in step 1123, for example, if the sample 103 will be measured in the same position subsequently (e.g., measuring a different feature at approximately the same location) and/or if the sample 103 will be moved after the method is complete following step 1125. In some embodiments, methods can follow arrow 1114 from step 1117 to step 1123 when the first signal is used to measure the feature and a next signal will be used to measure another feature at a different location on the sample. For example, following arrow 1114 can omit step 1121 comprising generating a second signal and/or step 1119 comprising adjusting the detection distance 139. It is to be understood that any of the above options may be combined to measure a feature of a sample (e.g., glass-based substrate) in accordance with embodiments of the disclosure.

Example

Figure 12:
FIG. 12 is a plot of the relationship between feature height measured in accordance with embodiments of the disclosure and actual feature height.

Various embodiments will be further clarified by the following example. FIG. 12 demonstrates the accuracy and precision of the apparatus and methods of the disclosure for measuring features of a sample. In FIG. 12, the horizontal axis 1201 (e.g., x-axis) is the height of a surface feature in nanometers (nm) of a glass-based substrate as measured using a Zygo NewView 9000 profilometer. The vertical axis 1203 (e.g., y-axis) is the height of a surface feature in nanometers (nm) of a glass-based substrate as measured using the apparatus shown in FIG. 1, where the illumination source 121 comprised a InGaAs laser diode. For most of the wave front measurements for features comprising a height between 1,000 nm and 2,250 nm, the detector 131 comprised a Shack-Hartman wave front sensor with total magnification of 10×. For the other wave front sensor measurements, the detector 131 comprised a quadri-wave lateral shearing interferometer with a total magnification of either a 20×, 40×, or 100×. The data corresponding to the heights of several features measured using the profilometer and the wave front sensors are plotted in FIG. 12. Measurements from the Shack-Hartmann wave front sensor and the quadri-wave lateral shearing interferometer are combined in FIG. 12 because measurements from both detectors correspond equally well with the profilometer measurements. A guideline 1205 with a slope of substantially 1 fits the data points with an $R^2$ of 0.9977. The linear fit indicates that the apparatus and methods of disclosure can provide measurements that directly correspond to the actual feature measured. The one-to-one correspondence indicates that the apparatus and methods of the disclosure can provide quantitative measurements. The low deviations of the points from the line indicate that the apparatus and methods of disclosure can provide precise measurements.

The above disclosure provides apparatus and methods for measuring a feature of a glass-based substrate that can facilitate quick, inline, quantitative measurement and/or characterization of features with reduced need for recalibration and/or realignment, which can increase production efficiency and decreasing processing time. Providing at least one wave front sensor can enable quantitative and accurate measurement of features that are vibration insensitive, for example, reducing the need for recalibration of the apparatus. Providing a wave front sensor can enable measurement while the glass-based substrate is moving and/or has recently been moved. Providing a wave front sensor can enable quick (e.g., about 100 milliseconds or less) measurement of features. Additionally, wave front sensors can be integrated with additional (e.g., existing) inspection apparatus (e.g., a camera).

Providing at least one wave front sensor can enable measurement enables measurement at various distances from the measurement plane (e.g., first major surface of the glass-based substrate). Adjusting a distance from the measurement plane can enable the different types of features (e.g., surface profile, blister, gas inclusion, metal inclusion) to be distinguished. Additionally, adjusting a distance from the measurement plane can be used to adjust the size of features that can be accurately and quantitatively detected. Providing more than one wave front sensor with different magnifications can enable measurement of a wide range of feature sizes simultaneously. For example, using more than one wave front sensor with different magnifications can reduce the need for subsequent inspection (e.g., reinspection) of the feature. Providing one or more wave front sensors and an illumination source in a first region that is opposite a second region comprising a reflector with a measurement plane (e.g., glass-based substrate) between the first region and the second region can reduce (e.g., alleviate) alignment issues between the illumination source and the wave front sensor. For example, providing a common support for both the illumination source and the wave front sensor can maintain alignment even when subject to vibrations or intentionally moved.

Directional terms as used herein—for example, up, down, right, left, front, back, top, bottom—are made only with reference to the figures as drawn and are not intended to imply absolute orientation.

It will be appreciated that the various disclosed embodiments may involve features, elements, or steps that are described in connection with that embodiment. It will also be appreciated that a feature, element, or step, although described in relation to one embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. For example, reference to "a component" comprises embodiments having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another embodiment. Whether or not a numerical value or endpoint of a range in the specification recites "about," the numerical value or endpoint of a range is intended to include two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein, unless otherwise noted, are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example, within about 5% of each other, or within about 2% of each other.

Unless otherwise expressly stated, it is in no way intended that any methods set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C. As used herein, the terms "comprising" and "including", and variations thereof shall be construed as synonymous and open-ended unless otherwise indicated.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of embodiments herein provided they come within the scope of the appended claims and their equivalents.

What is claimed is:

1. An apparatus comprising:
an illumination source positioned in a first region and at least one wave front sensor positioned in the first region;
a reflector positioned in a second region;
a measurement plane positioned between the first region and the second region, wherein the illumination source is configured to emit light that impinges on the measurement plane, the reflector is configured to reflect the light from the illumination source, and the at least one wave front sensor is configured to detect the light reflected by the reflector;
a beam splitter configured to split the light into a plurality of beams; and the at least one wave front sensor comprises a first wave front sensor configured to detect a first beam of the plurality of beams and a second wave front sensor configured to detect a second beam of the plurality of beams.

2. The apparatus of claim 1, wherein a path distance between the illumination source and the measurement plane is adjustable.

3. The apparatus of claim 1, wherein a detection distance between the at least one wave front sensor and the measurement plane is adjustable.

4. The apparatus of claim 1, wherein the illumination source is configured to emit light comprising coherent light.

5. The apparatus of claim 1, wherein the illumination source is configured to emit light comprising a pulse.

6. The apparatus of claim 1, wherein the illumination source comprises a laser.

7. The apparatus of claim 1, further comprising an optical device configured to change a magnification of the first beam.

8. The apparatus of claim 1, further comprising an optical camera configured to detect the first beam of the plurality of beams.

9. A method of measuring a feature of a glass-based substrate comprising:
transmitting light through a thickness of the glass-based substrate towards a first major surface of the glass-based substrate and through a target location of the first major surface of the glass-based substrate, the thickness defined between the first major surface and a second major surface;
detecting the light transmitted through the target location using at least one wave front sensor;
generating a first signal with the at least one wave front sensor based on the detected light;
moving the glass-based substrate in a direction transverse to the thickness of the glass-based substrate before the transmitting the light through the thickness;
moving the glass-based substrate in the direction transverse to the thickness of the glass-based substrate after the detecting the light transmitted through the target location using the at least one wave front sensor;
splitting the light transmitted through the target location into a plurality of beams comprising a first beam and a second beam; and
changing a magnification of the first beam,
wherein detecting the transmitted light using the at least one wave front sensor comprises:
detecting the first beam with a first wave front sensor of the at least one wave front sensor; and
detecting the second beam with a second wave front sensor of the at least one wave front sensor, and
wherein a measurement time defined between an end of the moving the glass-based substrate before the transmitting the light through the thickness and a beginning of the moving the glass-based substrate after the detecting the light transmitted through the target location using the at least one wave front sensor is about 100 milliseconds or less.

10. The method of claim 9, further comprising:
impinging light on a measurement plane of the glass-based substrate, the measurement plane extending transverse to a thickness of the glass-based substrate, the thickness defined between a first major surface of the glass-based substrate and a second major surface of the glass-based substrate; and
reflecting the light towards the glass-based substrate before transmitting the light through the thickness.

11. The method of claim 9, further comprising determining a height and/or width of a feature of the glass-based substrate based on the generated first signal.

12. The method of claim 11, wherein the determining the height and/or width of the feature of the glass-based substrate is further based on an index of refraction of the glass-based substrate.

13. The method of claim 9, further comprising detecting the first beam with an optical camera.

14. The method of claim 9, wherein the light comprises a first pulse, the method further comprising:
adjusting a detection distance between the first major surface and the at least one wave front sensor;
impinging the measurement plane with a second pulse;
reflecting the second pulse towards the glass-based substrate and through the thickness of the glass-based substrate;
transmitting the reflected second pulse towards the first major surface of the glass-based substrate and through the target location of the first major surface of the glass-based substrate;
detecting the second pulse transmitted through the target location using the at least one wave front sensor; and
generating a second signal with the at least one wave front sensor based on the detected second pulse.

15. The method of claim 14, further comprising measuring the feature using the first signal and the second signal.

* * * * *